United States Patent [19]

White

[11] Patent Number: 4,549,346
[45] Date of Patent: Oct. 29, 1985

[54] APPARATUS FOR ASSEMBLING A DYNAMOELECTRIC MACHINE

[75] Inventor: Robert W. White, DeKalb, Ill.

[73] Assignee: General Electric Company, Fort Wayne, Ind.

[21] Appl. No.: 506,344

[22] Filed: Jun. 21, 1983

[51] Int. Cl.[4] .............................................. H02K 15/14
[52] U.S. Cl. ....................................... 29/736; 29/596; 29/732
[58] Field of Search ................... 29/736, 732, 596, 598; 310/42, 89, 90, 91

[56] References Cited

U.S. PATENT DOCUMENTS

| 3,857,170 | 12/1974 | Stoner | 29/596 |
| 3,961,416 | 6/1976 | Otto | 29/596 |
| 4,087,903 | 5/1978 | Stoner | 29/596 |

*Primary Examiner*—Carl E. Hall
*Attorney, Agent, or Firm*—Joseph E. Papin

[57] ABSTRACT

Apparatus for assembling a stator for a dynamoelectric machine with an end frame therefor. The stator includes a bore having an axis, and a set of beams secured to the stator and having at least one end portion, respectively, and the end frame includes alignable bearing means associated therewith for defining a generally central axis of the end frame. The apparatus comprises means for supporting the stator with the stator being movable thereon, and locating means having a predetermined reference axis is operable generally for locating engagement with the stator bore to align the axis thereof with the predetermined reference axis. Means is associated with the locating means so as to extend generally along the same predetermined reference axis thereof for receiving in locating engagement the alignable bearing means of the end frame thereby to align the central axis thereof with the aligned predetermined reference axis and the stator bore axis at least when the end frame is engaged against the at least one end portions of the beams, respectively.

13 Claims, 30 Drawing Figures

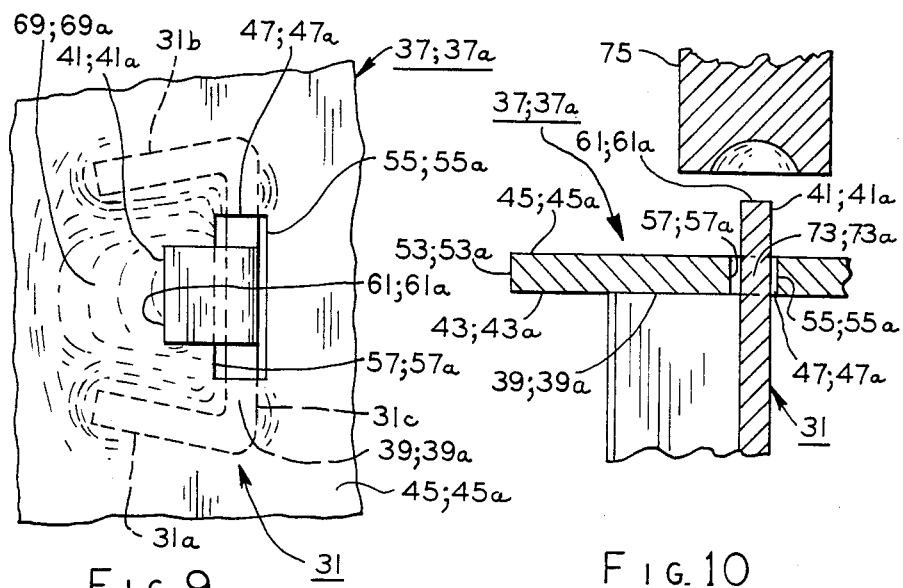
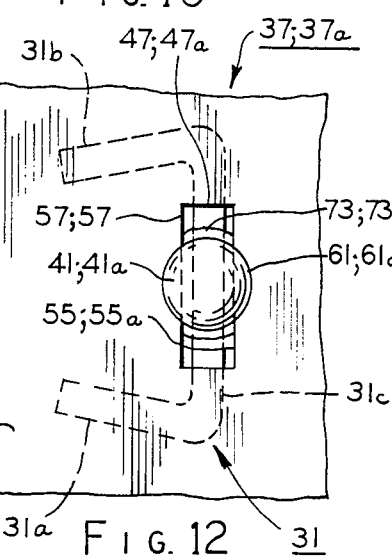
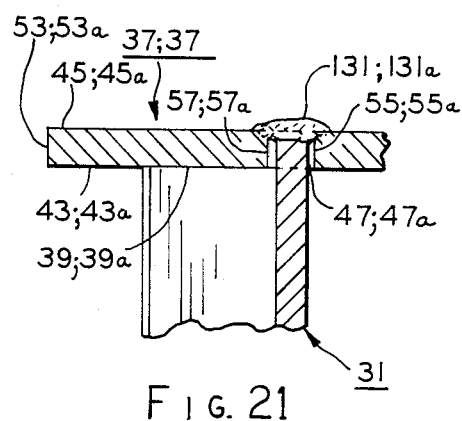

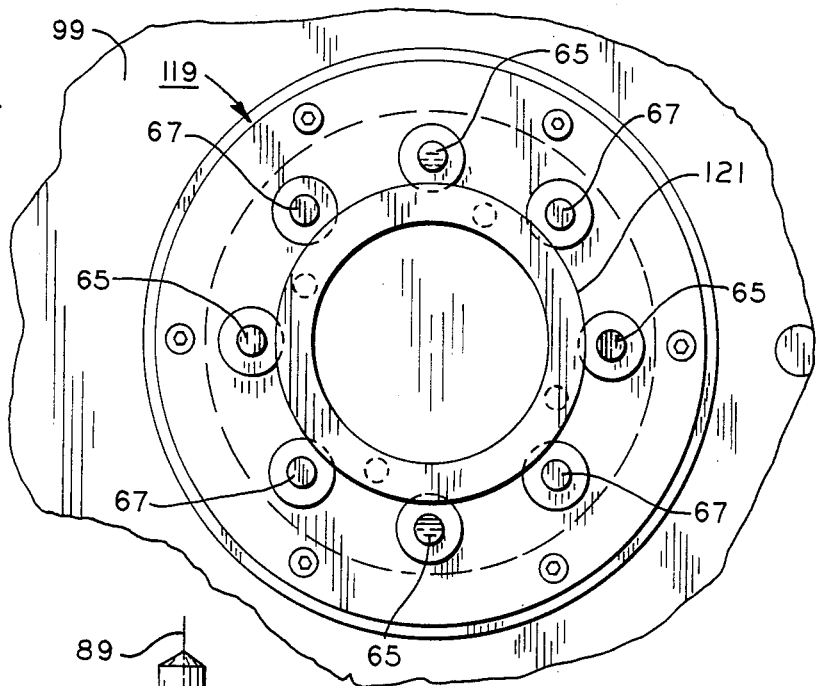
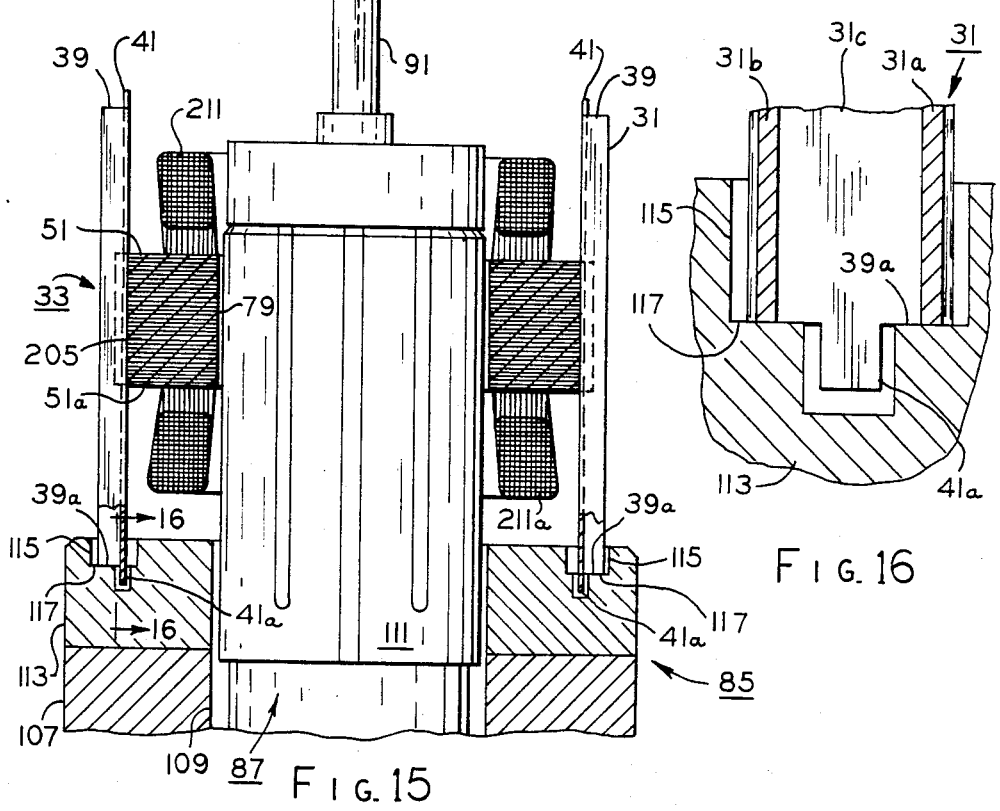

APPARATUS FOR ASSEMBLING A DYNAMOELECTRIC MACHINE

CROSS-REFERENCE TO RELATED APPLICATIONS

This application is related to the commonly assigned Robert W. White application Ser. No. 402,320 filed July 27, 1982 (now U.S. Pat. No. 4,473,764 issued Sept. 25, 1984) and also the commonly assigned Robert W. White and Frank R. Kuzan application Ser. No. 402,282 filed July 27, 1982 (now U.S. Pat. No. 4,480,378 issued Nov. 6, 1984), and each of these commonly assigned applications is incorporated herein by reference.

FIELD OF THE INVENTION

This application relates in general to electrical apparatus and in particular to an improved apparatus for a dynamoelectric machine.

BACKGROUND OF THE INVENTION

In general, dynamoelectric machines, such as electric motors, are basically categorized as being of three different types of construction, i.e., a totally enclosed motor, a drip-proof motor and an open motor. One definition of a totally enclosed motor is that it is so enclosed as to prevent the free exchange of air between the inside and the outside of the motor housing but not sufficiently enclosed to be air tight, and an example of such totally enclosed motor is illustrated in U.S. Pat. No. 2,974,856 issued to R. E. Seely on Mar. 14, 1961. A definition of an open motor is that it has ventilating openings which permit passage of external cooling air over and around the windings of such open motor, and examples of such open motor are illustrated in U.S. Pat. No. 3,164,422 issued Jan. 5, 1965 to Paul B. Shaffer et al. and U.S. Pat. No. 3,858,067 issued Dec. 31, 1974 to Charles W. Otto. One definition of a drip-proof motor is that it is an open motor in which the ventilation openings are so constructed that successful operation is not interfered with when drops of liquid or solid particles strike or enter the housing thereof at any angle from about 0° to about 15° downwardly from the vertical, and an example of such drip-proof motor is illustrated in U.S. Pat. No. 3,270,223 issued Aug. 30, 1966 to R. E. Seely. The foregoing definitions of totally enclosed, drip proof and open motors may be found in the C. G. Veinott textbook entitled "Fractional and Subfractional Horsepower Electric Motors" (third edition, McGraw-Hill Book Co.).

Further, with respect to the open motor construction of the aforementioned U.S. Pat. No. 3,858,067, a plurality of beams secured to a stator had a pair of opposite end portions received within a plurality of sockets provided in a pair of opposite end frames, respectively. In order to secure the opposite end frames against displacement from the opposite end portions of the beams, metallic plugs were solidified and contained generally within the sockets and were respectively interconnected between the opposite end portions of the beams and at least a portion of the sockets.

In U.S. Pat. No. 3,164,422, the open motor construction shown therein included a stator having four circumferentially spaced apart welding surfaces on the periphery thereof, and a pair of opposite end frames were positioned adjacent opposite sides or faces of the stator, respectively. Four spaced apart flanges integrally formed on the opposite end frames extended axially therefrom so as to be arranged generally in aligned relation with each other and in overlaying relation with the four peripheral welding surfaces on the stator, respectively. In order to secure the stator and opposite end frames together against displacement, the four flanges of the opposite end frames were spot welded to the four peripheral welding surfaces on the stator, respectively.

The aforementioned White U.S. Pat. No. 4,473,764 and the White and Kuzan U.S. Pat. No. 4,480,378 illustrate another open motor construction and method of assembling such. In these applications, an end frame has a pair of opposite faces with a set of apertures intersecting therebetween. A set of beams secured to a stator each have an abutment end disposed at least adjacent one of the opposite faces of the end frame, and the tabs of the beams protrude through the apertures in the end frame in spaced apart relation with the sidewalls of the apertures, respectively. The tabs are welded into displacement preventing engagement with the other opposite face of the end frame at least adjacent the apertures therein, respectively.

While the above discussed prior art dynamoelectric machines and methods of assembling such undoubtedly exhibit salient features, it is quite desirable to provide an improved yet inexpensive dynamoelectric machine having the capability to be used for a number of diverse applications having different duty capacities which may require different structural strengths with little change in the structural components and with little change in the method of assembling such.

OBJECTS OF THE INVENTION

Among the objects of the present invention may be noted the provision of an improved apparatus for assembling a dynamoelectric machine; the provision of such improved apparatus for effecting a uniform air gap between a stator and a rotor of the dynamoelectric machine without the use of shims; the provision of such improved apparatus which provide sufficient stator beam-to-end frame strength which is resistant to normal handling and operating forces tending to distort the air gap; the provision of such improved apparatus in which different stator beam-to-end frame strengths may be predeterminately effected in accordance with the intended use for the dynamoelectric machine, i.e., its intended application or duty capacity; the provision of such improved apparatus in which tabs on abutment portions of the stator beams extend through apertures in the end frame and are deformed into displacement preventing engagement with the end frame so as to retain the end frame against both radial and axial displacement with respect to the stator; the provision of such improved apparatus in which the tabs are deformed into engagement with the end frame within the apertures therein to retain the end frame against radial displacement with respect to the stator and also into engagement with one opposite face of the end frame to retain it against axial displacement with respect to the stator; the provision of such improved apparatus in which a set of sections are deformed from the end frame into locking relation with the abutment ends of the beams thereby to assist in the retention of the end frame against the radial displacement with respect to the stator, respectively. These as well as other objects and advantageous features of the present invention will be in part apparent and in part pointed out in the specification which follows.

In one form of the invention, apparatus is provided for assembling a stator for a dynamoelectric machine with an end frame therefor. The stator includes a bore having an axis, and a set of beams secured to the stator and having at least one end portion, respectively, and the end frame includes alignable bearing means associated therewith for defining a generally central axis of the end frame. The apparatus comprises means for supporting the stator with the stator being movable thereon, and locating means having a predetermined reference axis is operable generally for locating engagement with the stator bore to align the axis thereof with the predetermined reference axis. Means is associated with the locating means so as to extend generally along the same predetermined reference axis thereof for receiving in locating engagement the alignable bearing means of the end frame thereby to align the central axis thereof with the aligned predetermined reference axis and the stator bore axis at least when the end frame is engaged against the at least one end portions of the beams, respectively.

Also in general, apparatus is provided for assembling a dynamoelectric machine with respect to a predetermined reference axis. The dynamoelectric machine includes a first subassembly of an interconnected stator and first end frame with the stator having a central axis and with first alignable bearing means associated with the first end frame for defining a central axis thereof arranged in prealigned relation with the central axis of the stator bore. Another subassembly of the dynamoelectric machine includes a rotatable assembly having a central axis and another alignable bearing means associated with another end frame for defining a central axis thereof aligned with the central axis of the rotatable assembly. The apparatus comprises yieldable means for seating the first subassembly and yieldable toward a displaced position to accommodate rocking movement of the first subassembly with respect to the predetermined reference axis. Means is provided for temporary engagement with the stator bore to locate it. Means is movable into engagement with the temporary engagement means upon the location thereby of the stator bore so as to be operable generally for effecting the alignment of the central axis of the stator bore with the predetermined reference axis, and the yieldable means is yieldable to the displaced position thereof to accommodate the rocking movement of the first subassembly in response to the operation of the alignment effecting means when the central axis of the stator bore is aligned with the predetermined reference axis. Means is movable into locating engagement with the rotatable assembly of the another subassembly for aligning the central axii of the rotatable assembly and the another end frame with the predetermined reference axis when the rotatable assembly is assembled in part within the stator bore and the first alignable bearing means thereby to also align the central axis of the first end frame with the predetermined reference axis upon the removal from the stator bore of the temporary engagement means. Means is operable generally for interconnecting the another end frame and the stator against both axial and displacement movement thereby to retain the central axii of the stator bore and the first end frame and the central axii of the rotatable assemby and the another end frame in alignment with each other, respectively.

BRIEF DESCRIPTION OF THE DRAWINGS

FIG. 9 is a top elevational view of the construction shown in FIG. 8;

FIGS. 10 and 11 are enlarged partial sectional views showing another alternative construction for the end frame and stator beams of the dynamoelectric machine of FIG. 1 in one form of the invention and illustrating principles which may be practiced in another alternative method of assembling the stator beams with the end frame;

FIG. 12 is a top elevational view of the construction of FIG. 11;

FIG. 14 is an enlarged bottom elevational view of a tool carrier arranged in an upper platen of the apparatus of FIG. 13;

FIG. 15 is an enlarged fragmentary view partially in section taken from FIG. 13 and showing a stator of the dynamoelectric machine of FIG. 1 loaded on the apparatus;

FIG. 16 is an enlarged sectional view taken along line 16—16 in FIG. 15;

FIG. 21 is an enlarged, fragmentary, partial sectional view taken along line 21—21 in FIG. 20 and showing the tab on the beam welded to the end frame;

Corresponding reference characters indicate corresponding parts throughout the several views of the drawing.

The exemplifications set out herein illustrate the preferred embodiments of the invention, and such exemplifications are not to be construed as limiting either the scope of the disclosure or the scope of the invention in any manner.

DETAILED DESCRIPTION OF THE PREFERRED EMBODIMENTS

Figure 1:
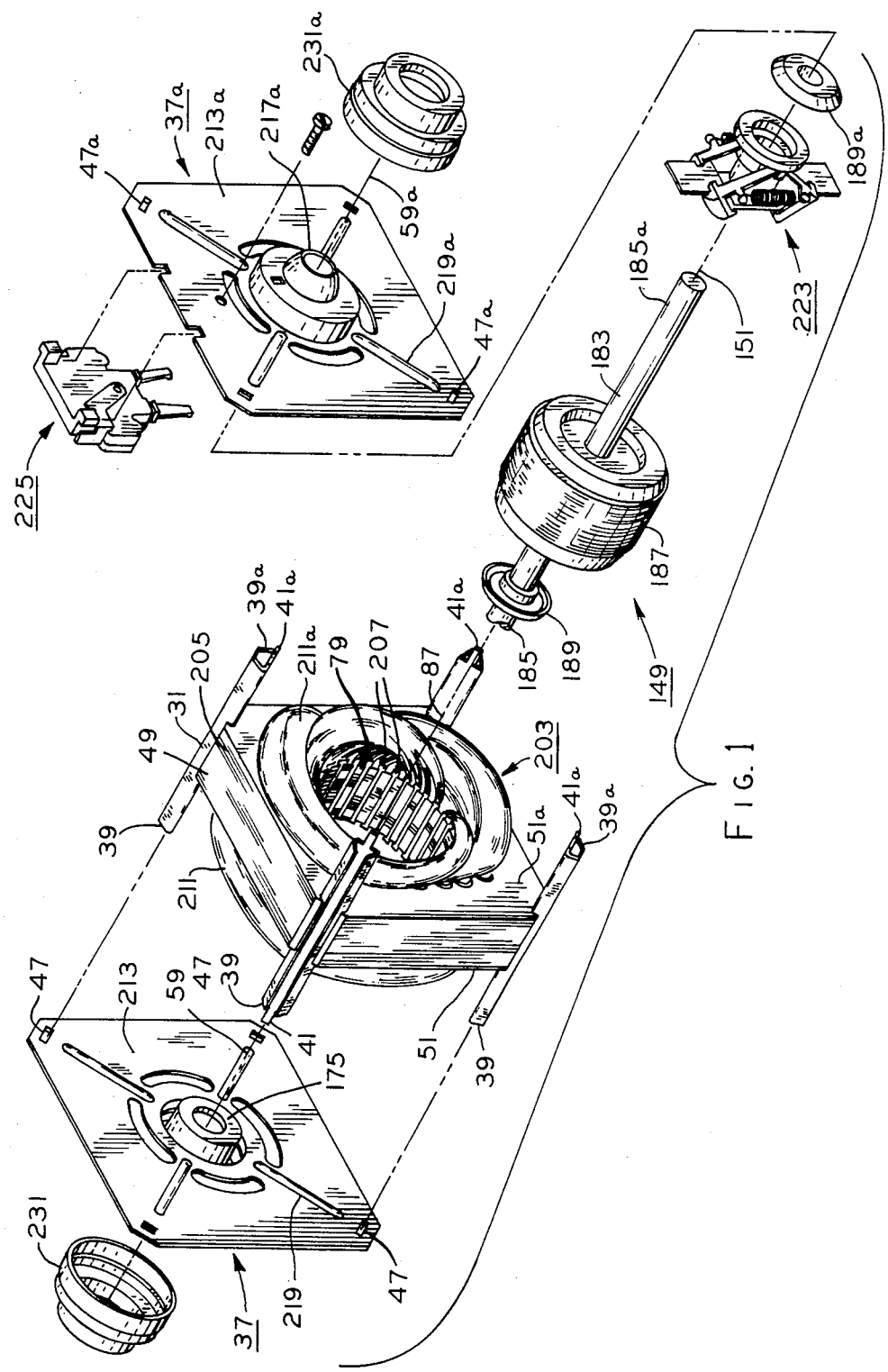
FIG. 1 is an exploded perspective view of a dynamoelectric machine.
Figure 2:
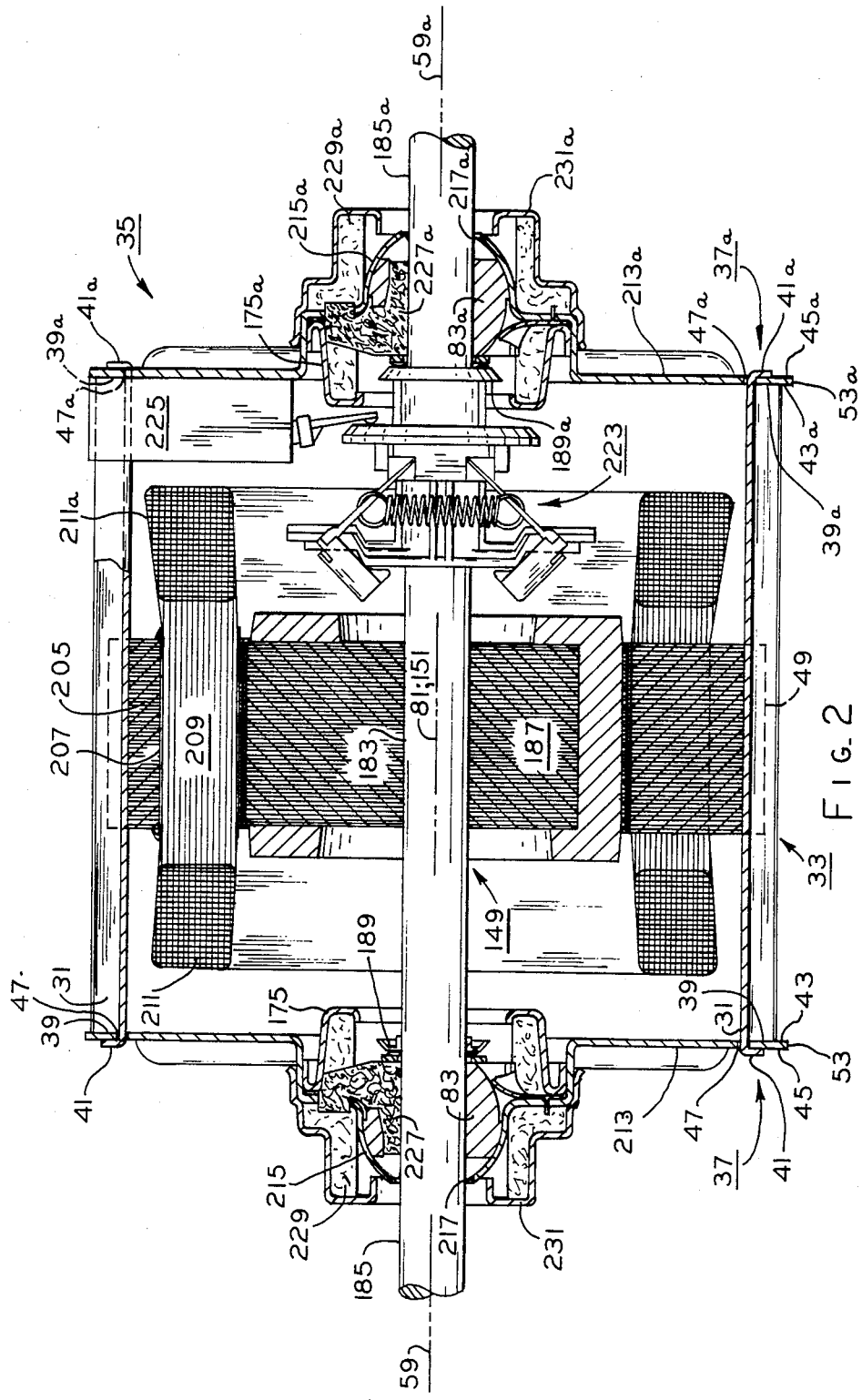
FIG. 2 is a partial sectional view illustrating the dynamoelectric machine in cross section with the components thereof in their assembly relation.
Figure 3:
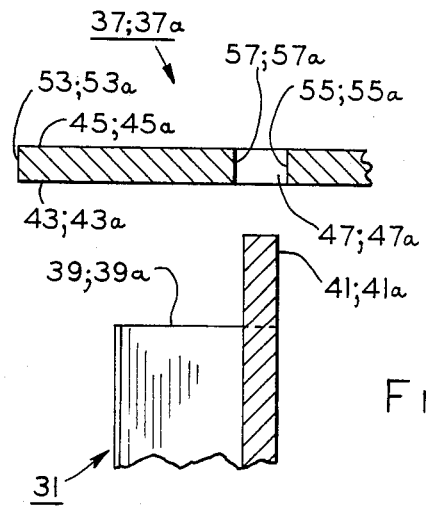
FIGS. 3, 4, 5 and 6 are greatly enlarged partial sectional views showing an end frame and a beam secured to a stator of the dynamoelectric machine of FIG. 1 and illustrating principles which may be practiced in a method of assembling a set of beams mounted to the stator with the end frame, respectively.
Figure 4:
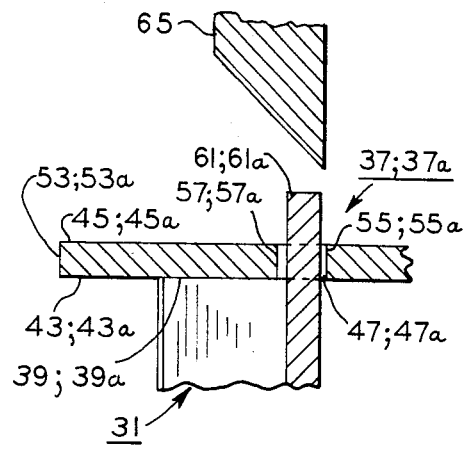

Referring now to the drawings in general, there is illustrated a method for assembling a set of beams 31 mounted to a stator 33 for a dynamoelectric machine 35 with an end frame 37 therefor so as to retain the end frame against both axial and radial displacement with respect to the stator (FIGS. 1-12). Beams 31 have an abutment end or portion 39 with a tab or extension 41 extending therefrom, respectively, and end frame 37 has a pair of opposite faces 43, 45 with a set of apertures 47 intersecting therebetween and sized predeterminately greater than tabs 41, respectively (FIGS. 1 and 3). In practicing this method, tabs 41 of beams 31 are extended or otherwise passed through apertures 47 and in part beyond opposite face 45 of end frame 37, and abutment portions 39 of the beams are disposed or otherwise arranged at least adjacent opposite face 43 of the end frame and generally adjacent the apertures therein, respectively (FIG. 4). Tabs 41 are deformed into engagement with end frame 37 within apertures 47 therein and with opposite face 45 of the end frame at least generally adjacent the apertures therein, and thereby the end frame is retained against both the radial and axial displacement displacement with respect to stator 33, respectively (FIGS. 5-12).

More particularly and with specific reference to FIGS. 1-7, beams 31 may be formed of any suitable material with the desired physical properties, the beams having a generally truncated or keystone shaped channel section open at the upper portion thereof and defined by a pair of opposite walls or wall means 31a, 31b interconnected generally at the bottom portion thereof by a cross-wall or wall means 31c, respectively. Beams 31 are secured or mounted by suitable means to stator 33 at least generally adjacent a circumferential or peripheral portion or surface 49 thereof, and the beams extend in generally axial opposite directions from a pair of opposite end faces or surfaces 51, 51a of the stator which intersect with the circumferential surface thereof. If a more detailed discussion of the beam and stator mounting arrangement is desired, reference may be had to U.S. Pat. No. 3,867,654 issued Feb. 18, 1975 to Charles W. Otto which is incorporated herein by reference. Abutment ends 39 of beams 31 are formed generally at one of the ends of opposite walls 31a, 31b and cross wall 31c of channel sections, and tabs 41 are integrally formed on the cross walls of the beams extending generally axially therefrom. Opposite abutment ends 39a and tabs 41a of beams 31 are shown herein for purposes of disclosure as being generally of the same construction as abutment ends 39 and tabs 41 thereof; however, it is contemplated that the beams may be of any desired construction within the scope of the invention so as to meet at least some of the objects thereof. As shown in FIGS. 3-12 for the purpose of drawing simplicity and convenience of disclosure, the letter "a" indicates corresponding opposite component parts of beams 31 and also corresponding parts of an opposite end frame 37a, as discussed hereinafter.

Apertures 47 are predeterminately located or arranged generally adjacent a circumferential or peripheral portion or edge 53 of end frame 37 for receiving tabs 41 of beams 31, as discussed in detail hereinafter, and each aperture has at least a pair of opposed sidewalls 55, 57 in the end frame intersecting with opposite faces 45, 47 thereof with the opposed sidewalls being disposed generally perpendicular to radius lines (not shown) emanating from a generally central axis 59 of the end frame, respectively.

Figure 5:
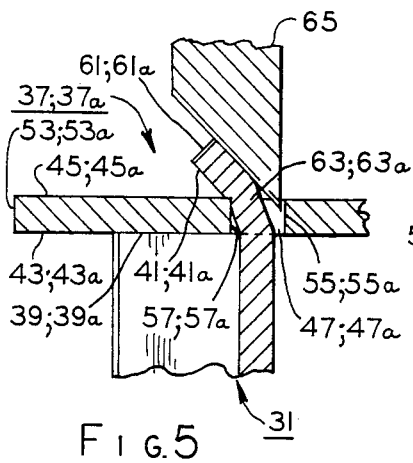
Figure 6:
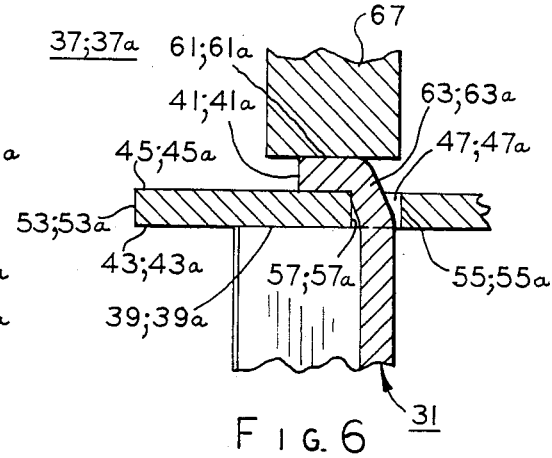
Figure 7:
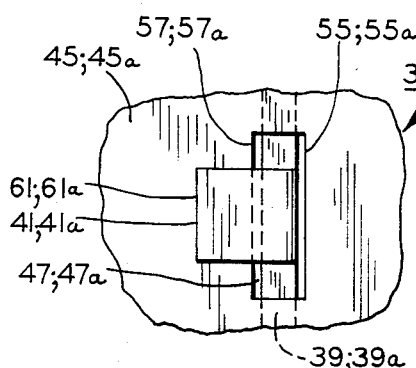
FIG. 7 is a top elevational view of the construction shown in FIG. 6.

In the following discussion of the assembly of beams 31 on stator 33 with end frame 37, only one of the beams and one of the apertures 47 in the end frame are shown in FIGS. 3-12 for purposes of drawing simplicity. As best seen in FIG. 3, tabs 41 on beams 31 are disposed adjacent opposite face 43 of end frame 37 and generally in alignment with apertures 47 of the end frame for entry thereinto, respectively. When tabs 41 are passed or otherwise moved from opposite face 43 of end frame 37 through apertures 47 toward opposite face 45 thereof, as best seen in FIG. 4, a set of distal free end portions or distal sections 61 on the tabs are extended or otherwise positioned beyond opposite face 45 of the end frame, respectively. Of course, the passage of tabs 41 through apertures 47 is terminated when abutment ends 39 of beams 31 are disposed at least generally adjacent or in engagement with opposite face 43 of end frame 37 at least generally adjacent the apertures therein, and with the beams and end frame so positioned, the tabs extend through the apertures in spaced apart relation from the sidewalls of the apertures which, as previously mentioned, are predeterminately sized greater than the tabs, respectively. It may be noted that due to warpage of end frame 37 and/or out of square, i.e., non-planar, abutment ends 39 of beams 31, an abutment end on at least one of the beams may not seat against opposite face 43 of the end frame; however, if desired, a force, as indicated by the force arrow FS, may be exerted against opposite face 45 of the end frame to insure the seating of the abutment ends of the beams with opposite face 43 of the end frame, as discussed in greater detail hereinafter. With beams 31 and end frame 37 so arranged in assembly relation with each other, tabs 41 are deformed or otherwise bent or displaced generally about abutment ends 39 of the beams, and a set of intermediate portions or sections 63 on the tabs are engaged with opposed sidewalls 57 of apertures 47 within end frame 37 at least generally adjacent the intersections of opposed sidewalls 57 with opposite face 45 of the end frame, respectively, as best seen in FIG. 5. Since opposed sidewalls 55, 57 of apertures 47 are arranged generally perpendicular to radius lines (not shown) emanating generally from central axis 59 of end frame 37, it may be noted that the engagements of intermediate sections 63 on tabs 41 with opposed sidewalls 57 retains the end frame against radial displacement with respect to beams 31, respectively. Further, it may also be noted that the retention of end frame 37 against the radial displacement with respect to beams 31, and therefore also with respect to stator 33, serves to effect a more uniform air gap in dynamoelectric machine 35, as discussed in greater detail hereinafter. Although only tool 65 is shown in FIG. 5 as effecting the deformation of the tab illustrated therein, it is apparent that a set of such tools is utilized to effect the generally simultaneous deformation of tabs 41, as discussed in greater detail hereinafter. Subsequent to the retention of end frame 37 against the radial displacement thereof with respect to beams 31 and stator 33, distal free end portions 61 on tabs 41 are generally simultaneously deformed or otherwise bent or displaced at least generally about the intersections of opposed sidewalls 57 with opposite face 45 of end frame 37 into engagement with opposite face 45 of the end frame at least generally adjacent apertures 47 therein, respectively, as best seen in FIGS. 6 and 7. Thus, it may be noted that the engagements of distal free end portions 61 on tabs 41 with opposite face 45 of end frame 37 retains the end frame against axial displacement with respect to beams 31 and therefore also with respect to stator 33. In other words, end frame 37 is captured between abutment ends 39 of beams 31 engaged with opposite face 43 of the end frame and distal free end portions 61 of tabs 41 deformed into displacement preventing engagement with opposite face 45 of the end frame, respectively. Although only tool 67 is shown in FIG. 6 as effecting the deformation of the tab shown therein, it is apparent that a set of such tools is utilized to effect the generally simultaneous deformation of distal free end portions 61 on tabs 41, as discussed in greater detail hereinafter. To complete the discussion concerning the method of assembling stator 33 with end frame 37, it is believed that the engagement of intermediate sections 63 on tabs 41 with opposed sidewall 57 in apertures 47 of end frame 37 may provide sufficient beam-to-end frame strength to adequately retain the end frame against radial displacement with respect to the beams for certain applications of dynamoelectric machine 35, i.e., certain duty capacities thereof; however, for other applications or duty capacities of the dynamoelectric machine, it may be desirable to increase the retention of end frame against radial displacement, as discussed below.

Figure 8:
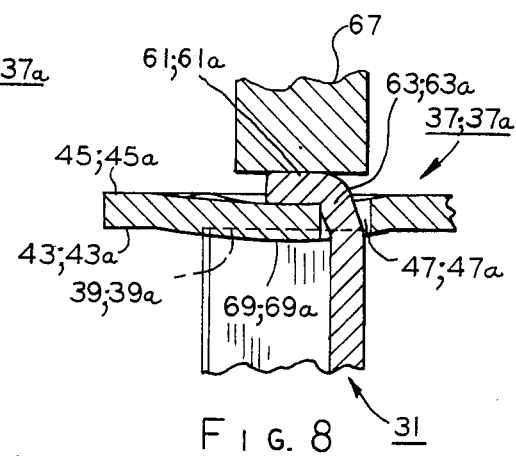
FIG. 8 is a partial sectional view generally the same as FIG. 6 showing an alternative construction for the end frame and stator beams of the dynamoelectric machine of FIG. 1 in one form of the invention and further illustrating principles which may be practiced in an alternative method of assembling the stator beams with the end frame.

With reference to FIGS. 8 and 9, an alternative construction is shown illustrating a method in one form of the invention for assembling beams 31 with end frame 37, and such alternative construction and method utilize generally the same component parts generally in the same manner as the previously described construction and method with the exceptions set out below. While this alternative construction and method meet at least some of the objects set out hereinbefore, it is believed that such alternative construction and method have indigenous objects and advantageous features as will be in part apparent and in part pointed out in the following discussion.

In this alternative construction and method, a set of sections 69 in end frame 37 are deformed or otherwise displaced or distorted at least generally conjointly with the deformations of distal free end portions 61 of tabs 41 into engagement with opposite face 45 of the end frame, and such deformed sections 69 are displaced generally into the channel sections of beams 31 about or within abutment ends 39 thereof. Thus, upon the deformation of sections 69 of end frame 37, parts of opposite face 43 of the end frame are urged or otherwise deformed into locking relation or engagement with the channel section of beams 31 about abutment ends 39 thereof, and this locking or gripping engagement assists in the retention of the end frame against the radial displacement thereof with respect to the beams arm therefore also with respect to stator 33. It may be noted that this locking relation of opposite face 43 on end frame 37 at least generally about abutment ends 39 of beams 31 is additive to the previously discussed engagement of intermediate sections 63 of tabs 41 with opposed sidewall 57 in apertures 47 within the end frame thereby to increase the forces retaining the end frame against the radial displacement thereof with respect to the beams and stator 33. Although only tool 67 is shown in FIG. 8 for effecting the generally simultaneous deformations of distal free end portions 61 of tabs 41 and sections 69 of end frame 37, it is apparent that a set of such tools is utilized to effect the generally conjoint deformations of the distal free end portions and the sections, as discussed in greater detail hereinafter. Although the deformations of distal free end portions 61 of tabs 41 and sections 69 in end frame 37 are illustrated herein as being generally simultaneously deformed by tool 67, it is contemplated that the sections in the end frame may be deformed by different tooling and subsequent to the deformations of the distal free end portions of the tabs within the scope of the invention so as to meet at least some of the objects thereof. To complete the discussion of this alternative assembling method, it is believed that the above discussed increased forces retaining end frame 37 against radial displacement with respect to beams 31 and stator 33 permits the utilization of dynamoelectric machine 35 in various other applications which may require a more rugged or heavier duty capacity.

In another alternative construction illustrating principles which may be practiced in another alternative method of assembling beams 31 with end frame 37 also in one form of the invention, as shown in FIGS. 10–12, this another alternative construction and method utilizes generally the same component parts generally in the same manner as the method first described hereinabove. While this alternative construction and method meets at least some of the objects and advantageous features set out hereinabove, it is believed that this alternative construction and method has indigenous objects and advantageous features which will be in part apparent and in part pointed out in the following discussion.

In the establishment of this alternative construction and in practicing this alternative method of assembling beams 31 with end frame 37, a set of intermediate sections 73 of tabs 41 are conjointly deformed or otherwise displaced, by suitable means such as riveting or swedging or the like for instance, into engagement with at least the opposed sidewalls 55, 57 of apertures 47 within end frame 37 thereby to retain the end frame against radial displacement with respect to beams 31 and stator 33. Of course, when intermediate sections 73 of tabs 41 are so deformed, it is contemplated that such intermediate sections may engage the entire sidewall surface of apertures 47 including opposed sidewalls 55, 57 within the scope of the invention so as to meet at least some of the objects thereof. It is contemplated that the deformations of intermediate sections 73 of tabs 41 occur subsequent to the passage of the tabs through apertures 47 in end frame 37 when abutment ends 39 of beams 31 are disposed at least adjacent opposite face 43 of the end frame. Of course, at least generally simultaneously with the deformations of intermediate sections 73 of tabs 41, distal free end portions 61 of the tabs may be, by swedging or riveting over for instance, deformed into engagement with opposite face 45 of the end frame thereby to retain it against axial displacement with respect to beams 31 and stator 33, as previously discussed. Although a tool 75 is illustrated in FIG. 10 for effecting the deformation of distal free end portion 61 and intermediate section 73 of tabs 41 shown therein, it is apparent that a set of such tools may be employed to effect the generally conjoint deformations of such intermediate sections and distal free end portions, as discussed hereinafter. Albeit not shown, it is anticipated that sections 69 in end frame 37 also may be deformed either generally conjointly with the generally conjoint deformation of intermediate sections 73 and distal free end portions 61 of tabs 41 or subsequent thereto to establish the locking relation of the end frame with abutment ends 39 of beams 31, as previously mentioned, within the scope of the invention so as to meet at least some of the objects thereof. To complete the discussion of this alternative construction and method, it is believed that the deformations of intermediate sections 73 on tabs 41 into engagement with at least opposed sidewalls 55, 57 of apertures 47 within end frame 37 and the deformations of distal free end portions 61 of the tabs into engagement with opposite face 45 of the end frame so as to retain the end frame against radial and axial displacement with respect to beams 31 and stator 33 effects a construction which permits the utilization of dynamoelectric machine 35 in applications of different duty capacities than those mentioned hereinabove.

Figure 13:
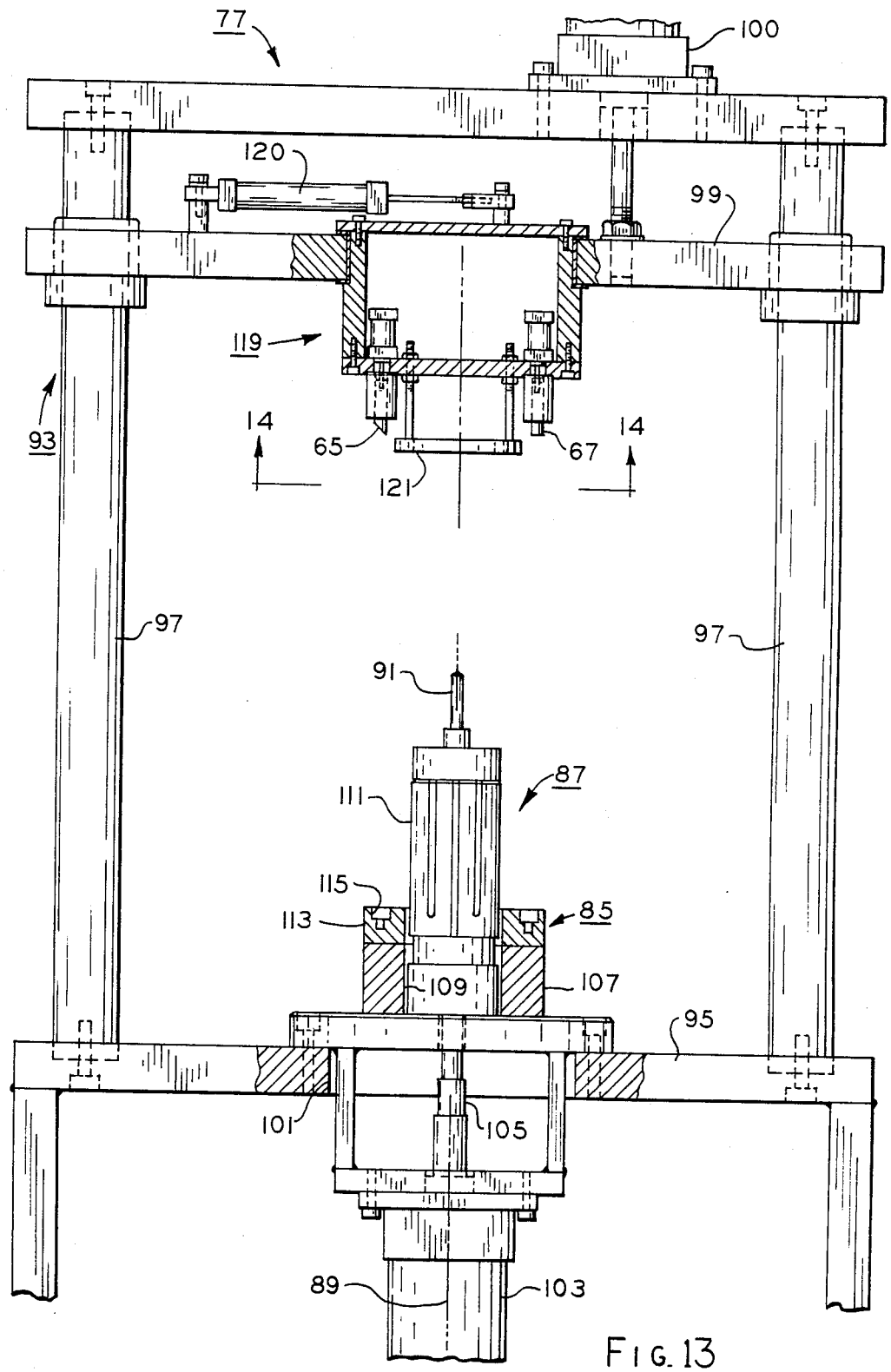
FIG. 13 is a front elevational view partially in cross section showing apparatus in one form of the invention for assembling the dynamoelectric machine of FIG. 1 and illustrating principles which may be practiced in a method of assembling the dynamoelectric machine.
Figure 17:
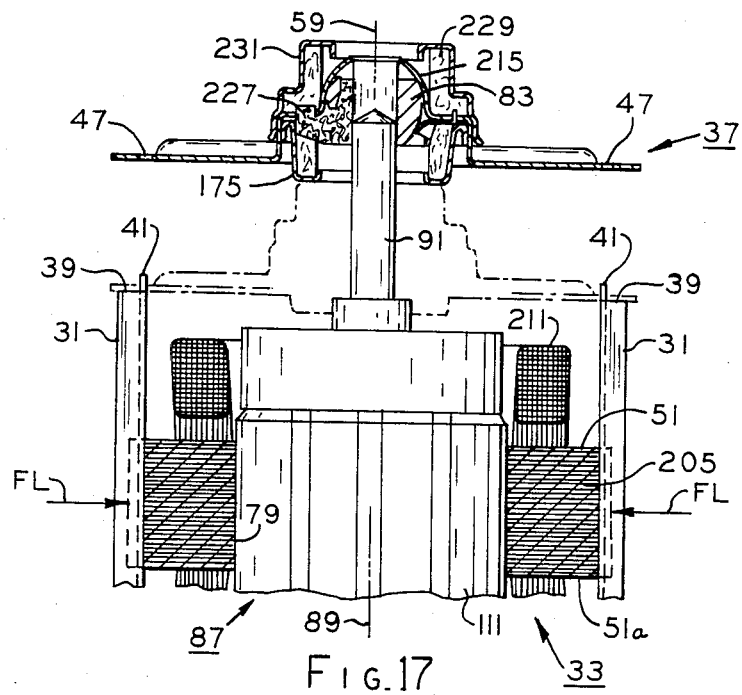
FIG. 17 is generally the same as FIG. 16 but showing an expandable arbor actuated into locating engagement with a bore of the stator with the end frame disposed in location engagement with a guide rod of the expandable arbor and seated on the beams of the stator.

With reference again to the drawings in general and recapitulating at least in part with respect to the foregoing, an apparatus 77 is disclosed in one form of the invention for assembling stator 33 for dynamoelectric machine 35 with end frame 37 therefor (FIGS. 13 and 14). Stator 33 includes a bore 79 having a central axis 81, and beams 31 secured to stator 33 have abutment ends 39 thereon, respectively (FIG. 1). End frame 37 includes an alignable bearing or bearing means 83 associated with the end frame for defining central axis 59 thereof (FIG. 2). Apparatus 77 has means, such as a support or supporting member 85 or the like for instance, for supporting stator 33 with the stator being movable thereon, and locating means, such as an expandable arbor 87 or the like for instance, arranged about a predetermined reference axis 89 of apparatus 77 is operable generally for locating engagement with stator bore 79 to align central axis 81 thereof at least generally coincidentally with the predetermined reference axis (FIGS. 13, 15 and 17). Means, such as a guide rod or extension means 91 or the like for instance, is associated with locating means or expandable arbor 87 so as to extend generally along the same predetermined reference axis 89 of apparatus 77 for receiving in locating engagement alignable bearing 83 of end frame 37 thereby to align central axis 57 of the end frame at least generally coincidentally with the aligned predetermined reference axis 89 and stator bore central axis 81 at least when the end frame is engaged against an abutment end 39 of at least some of beams 31 (FIG. 13).

More particularly and with specific reference to FIG. 13, apparatus 77 generally comprises a first work station for assembling or securing together stator 33 and end frame 37 of dynamoelectric machine 35, and the apparatus generally includes a press 93 or the like for instance having a stationary lower platen or base 95, a set of guide or dowel pins 97 fixedly secured to the base, and an upper platen or head 99 reciprocally movable on the dowel pins in guided relation with respect to the base by suitable means, such as a double acting fluid motor 100 or the like for instance. Thus, a reference axis 89 is predeterminately provided or established in apparatus 77 by the guided relation of head 99 on dowel pins 97 with respect to base 95, and it may be noted that the other component parts, as discussed hereinafter, of the apparatus are arranged generally coaxially with the reference axis of the apparatus.

Base 95 has an opening 101 extending therethrough generally in coaxial relation with reference axis 89 of apparatus 77, and means, such as for instance a double acting fluid motor 103 or the like, for actuating arbor 87 includes means, such as a reciprocally movable push rod 105 or the like for instance, which extends through the base opening for operating or driving engagement with arbor 87. Of course, arbor 87, fluid motor 103 and its push rod 105 are generally coaxially arranged with reference axis 89 of apparatus 77, and the arbor and the fluid motor are fixedly mounted by suitable means to the upper and lower sides of base 95, respectively.

Support 85 comprises a generally cylindric support sleeve or member 107 having a bore 109 arranged generally coaxially about reference axis 89 of apparatus 77 and an expandable sleeve 111 of arbor 87. Support sleeve 107 has its lower end secured by suitable means (not shown) to the upper side of base 95 about opening 101 therein, and means, such as a generally annular or disc-shaped plate 113 or the like for instance, is carried on the support sleeve for seating or receiving beams 31 of stator 33 as best seen in FIG. 15. A set of means, such as for instance locating recesses 115 or the like, are provided in plate or seating means 113 for receiving opposite abutment ends 39a of beams 31, and a set of means, such as for instance locating surfaces 117 or the like, are arranged within receiving means or recesses 115 in the plate for locating engagement with opposite abutment ends 39a of beams 31, respectively; however, for the sake of drawing simplicity only one of the locating recesses is shown in detail in FIG. 16. Guide rod 91 is secured by suitable means to the upper or free end of arbor 87 and extends therefrom generally toward head 99 of apparatus 77 so as to be generally coaxial with reference axis 89 of the apparatus, as previously mentioned. Arbor 87 is available as model number B-16000 from Speedgrip Chuck, Inc., Elkhart, Ind.

Means, such as a tool carrier 119 or the like for instance, is coaxially arranged in head 99 of apparatus 77 about reference axis 89 thereof for carrying sets of tools 65 and 67, as best seen in FIGS. 13, 14, 18 and 19, and carrying means or tool carrier 119 is adapted to be indexed or rotated with respect to the apparatus head by suitable means, such as a double acting fluid motor 120 or the like for instance, thereby to place or locate the tool sets in position to effect the deformation of tabs 41 on beams 31, as discussed hereinafter. To complete the description of apparatus 77, a means, such as a force transmitting or press plate 121 or the like for instance, is arranged on carrier 119 so as to extend downwardly therefrom for exerting or applying the force FS onto end frame 37 to associate it in assembly relation with stator 33, as also discussed in greater detail hereinafter and as best seen in FIGS. 13, 14, 18 and 19.

In the operation of apparatus 77, an operator may manually load or place bore 79 of stator 33 about expandable sleeve 111 of arbor 87, and upon such loading of the stator, opposite abutment ends 39a of beams 31 are inserted into recesses 115 of seating plate 113 generally into locating or seating engagement with locating surfaces 117 within the recesses in the seating plate, respectively, as best seen in FIGS. 15 and 16. However, this seating of beams 31 in seating plate 113 does not necessarily align central axis 81 of stator bore 79 with reference axis 89 of apparatus 77, and in the event that opposite abutment ends 39a of the beams are not square, i.e., generally planar, with each other, at least one of such opposite abutment ends of the beams may not be seated against its locating surface 117 on seating plate 113. Furthermore, at least in some instances, bore 79 of stator 33 may be slightly skewed with respect to opposite end faces 51, 51a of the stator, as is well known in the art, so that central axis 89 of the stator bore is not coincidental with reference axis 89 of apparatus 77 when the stator is disposed about expandable sleeve 111 of arbor 87 and seated on support 85.

In order to positively locate central axis of stator bore 79 when stator 33 is loaded on support 85 about expandable sleeve 111 of arbor 87, fluid motor 103 may be actuated to move its push rod 105 in a direction to effect the operation of the arbor thereby to effect the movement or expansion of its expandable sleeve 111 generally radially outwardly into locating engagement with the stator bore, as best seen in FIG. 17. In response to this locating engagement of expansible sleeve 111 on arbor 85 with stator bore 79, stator 33 may be adjustably moved with respect to support 87 therefor so that central axis 81 of the stator bore becomes aligned at least generally coincidentally with reference axis 89 of apparatus 77. Thus, in the event of the occurrence of the aforementioned skewing of stator bore 79 with respect to opposite end faces 51, 51a of stator 33, the above discussed positive location of central axis 81 of stator bore 79 and the alignment thereof with reference axis 89 of apparatus 77 compensates for such skewing in the event of the occurrence thereof in the stator.

When central axis 81 of stator bore 79 is so located and aligned with reference axis 89 of apparatus 77, locking means, as illustrated by opposed force arrows FL in FIG. 17, are actuated into engagement with peripheral portion 49 of stator 33 thereby to lock or positively retain the stator against displacement movement so as to insure the maintenance of the aligned relation between the central axis of the stator bore and the reference axis of the apparatus. While the locking means are illustrated herein by opposed force arrows FL for convenience of disclosure, it is contemplated that various different devices well known to the art may be utilized to effect the above discussed locking of stator 33 within the scope of the invention so as to meet at least some of the objects thereof.

Subsequent to the locking of stator 33, as discussed above, the operator may manually arrange or place alignable bearing 83 of end frame 37 in aligning relation or locating engagement about guide rod 91 on arbor 87. Of course, as previously mentioned, alignable bearing 83 defines central axis 59 of end frame 37, and guide rod 91 on arbor 87 is predeterminately coaxially arranged with reference axis 89 of apparatus 77. Thus, due to this coaxial relation of guide rod 91 with reference axis 89 of apparatus 77, the arrangement of alignable bearing 83 in end frame 37 in locating engagement about the guide rod serves to align central axis 59 of the end frame at least generally coincidentally with reference axis 89 of apparatus 77 and with which central axis 81 of stator bore 79 is aligned, as previously discussed.

Figure 18:
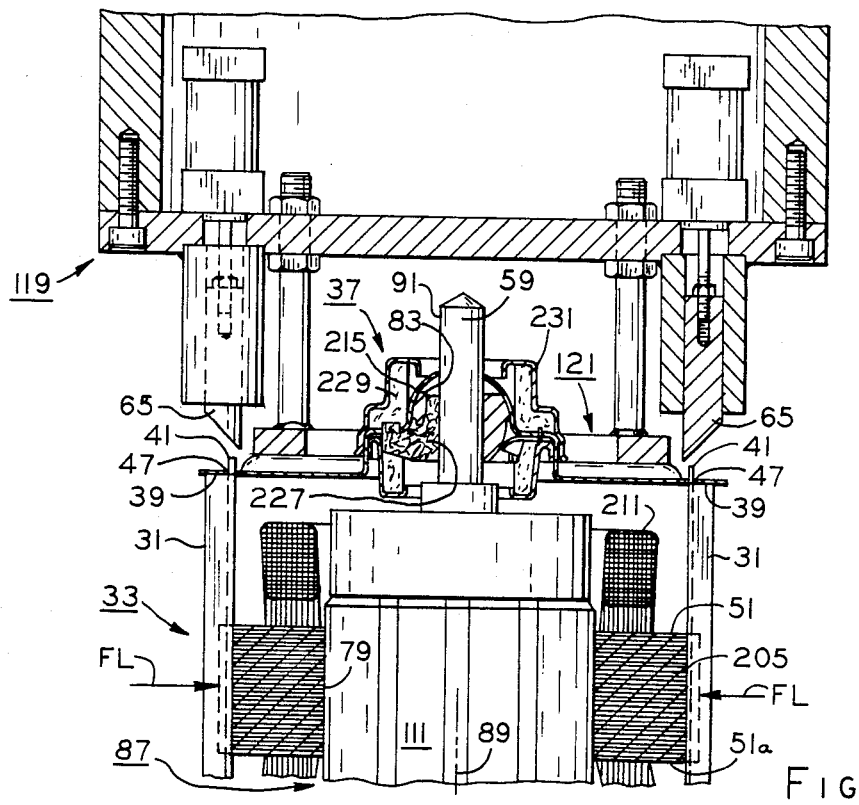
FIG. 18 is an enlarged fragmentary view of the apparatus of FIG. 13 showing the upper platen thereof lowered into a preselected position with a press plate on the tool carrier engaged with the end frame seated on the beams, as shown in FIG. 17, and with the tool carrier disposed to effect the initial deformations of the tabs on the beams.

With alignable bearing 83 in end frame 37 so disposed in locating engagement about guide rod 91, the operator may manually slide the alignable bearing with the end frame generally downwardly on the guide rod toward the position of the end frame, as illustrated in dotted outline in FIG. 17, with respect to stator 33. During this downward movement of alignable bearing 83 with end frame 37, the operator passes apertures 47 in the end frame over tabs 41 on beams 31 seating or engaging opposite face 43 of the end frame against at least some of abutment ends 39 of the beams, respectively, as previously discussed and as seen in FIG. 18. With tabs 41 on beams 31 so received within apertures 47 in end frame 37, it may be noted that the tabs are predeterminately spaced away from the sidewalls of the apertures, i.e., generally in radially spaced relation between at least opposed sidewalls 55, 57 of the apertures, with distal free end portions 61 of the tabs extending beyond opposite face 45 of the end frame, respectively, as previously mentioned. Thus, when end frame 37 is seated against at least some of abutment ends 39 of beams 31, it may also be noted that central axii 59, 81 of the end frame and the stator bore 79 are aligned with reference axis 89 of apparatus 77 while stator 33 remains locked against displacement movement by locking means FL.

With stator 33 and end frame 37 to engaged, head 99 of apparatus 77 may be moved downwardly by fluid motor 100 on dowel pins 97 toward base 95 into a preselected position with respect thereto, as shown in FIG. 18, and press plate 121 may be actuated into engagement with the end frame to exert the forces FS against opposite face 45 of the end frame, respectively. Of course, the magnitude of forces FS applied by press plate 121 is predeterminately great enough to insure the seating of opposite face 43 on end frame 37 against all of opposite abutment ends 39 of beams 31 at least generally adjacent apertures 47 in the end frame, respectively. Thus, the exertion of forces FS by press plate 121 against end frame 37 to effect the engagement thereof with opposite abutment ends 39 of beams 31 not only serves to compensate for any warpage in the end frame in the event of the occurrence thereof but also may effect the movement of at least one of the beams with respect to its securement to stator 33 in order to seat opposite abutment end 39a of such at least one beam against its locating surface 117 on seating plate 113 thereby to insure that opposite abutment ends 39, 39a of the beams are square, i.e. generally planar, with each other, respectively. While press plate 121 is illustrated herein in association with head 99 and carrier 119 of apparatus 77 for exerting forces FS onto end frame 37, it is contemplated that other devices, such as springs or fluid operated rams or the like for instance associated with either the head or the carrier, may be utilized to exert such forces within the scope of the invention so as to meet at least some of the objects thereof. When so engaged with abutment ends 39 of beams 31, end frame 37 is arranged or otherwise located in assembly relation or position with respect to stator 33 and the beams, and in such assembly relation, central axii 59, 81 of the end frame and stator bore 79 remain aligned with reference axis 89 of apparatus 77. Further, tabs 41 on beams 31 remain extended through apertures 47 in end frame 37 in spaced apart relation with the sidewalls thereof, respectively. Of course, the exertion of forces FS by press plate 121 against end frame 37 urging it toward the assembly relation with stator 33 is also effective to maintain the end frame against displacement movement from such assembly relation when the stator is locked against displacement movement by locking means FL.

With press plate 121 so urging end frame into the assembly relation thereof with stator 33, tools 65 in carrier 119 of head 99 are predeterminately disposed to effect the initial deformation of tabs 41. Thus, tools 65 are actuated generally simultaneously by suitable means well known to the art (not shown) to effect the generally simultaneous, initial, deformation of tabs 41 thereby to engage intermediate sections 63 of the tabs with opposed sidewalls 57 of apertures 47 in end frame 37 so as to retain it against radial displacement with respect to beams 31 and stator 33, respectively, as previously discussed in detail. This initial deformation of one intermediate section 63 of tabs 41 into displacement preventing engagement with aperture sidewall 57 on end frame 37 is best seen in FIG. 5. It may be noted that opposite pairs of apertures 47 in end frame 37 and tabs 41 on beams 31 are predeterminately arranged so as to be generally radially spaced on opposite sides of central axis 59 of the end frame when in the assembly relation thereof with stator 33. Further, it may also be noted that opposite pairs of tools 65 are generally simultaneously actuated in directions generally radially of central axis 59 of end frame 37 so that the tool forces or deformation forces exerted onto the end frame are generally self-cancelling, i.e., generally equal and opposite, when intermediate sections 63 of tabs 41 are deformed into engagement with aperture sidewalls 57 on the end frame, respectively. In this manner, the self-cancelling force effect of tools 65 does not affect the aligned relation of central axii 59, 81 of end frame 37 and stator bore 79 with reference axis 89 of apparatus 77 or the assembly relation of the end frame with stator 33.

Figure 19:
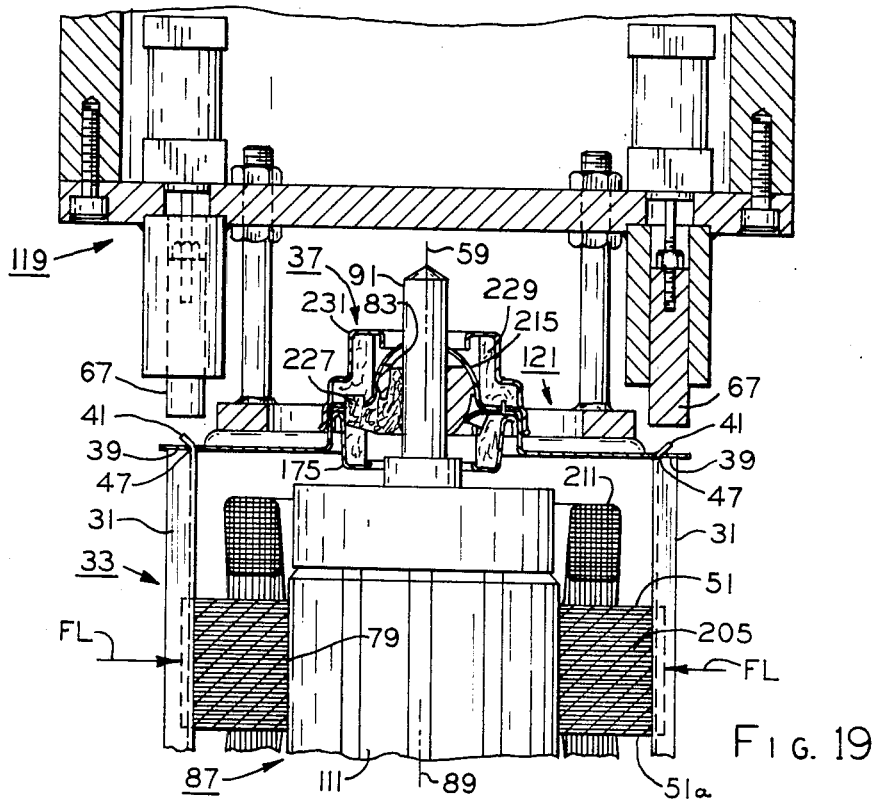
FIG. 19 the same as FIG. 18 but with the tool carrier indexed into a preselected position disposing a set of tools thereon to effect the subsequent deformations of the tabs on the beams.

After the initial deformation of tabs 41 by tools 65, carrier 119 in head 99 may be rotated or indexed by fluid motor 120 toward a preselected indexed position in which tools 67 of the carrier are predeterminately disposed to effect the subsequent deformation of tabs 41, as best seen in FIG. 19. When carrier 119 is in the preselected indexed position thereof, tools 67 are also actuated generally simultaneously by suitable means well known to the art (not shown) to effect the generally simultaneously deformation of distal free end portions 61 of tabs 41 into engagement with opposite face 45 of end frame 37 thereby to retain the end frame against axial displacement from the assembly relation thereof with respect to beams 31 and stator 33, respectively. This subsequent deformation of one distal free end portion 61 on tabs 41 into displacement preventing engagement with opposite face 45 of end frame 37 is best seen in FIGS. 6 and 7. Of course, upon the indexing of carrier 119, press plate 122 is indexed therewith being rotatably slidable on end frame 37.

Alternatively, the deformations of sections 69 of end frame 37 into the locking engagement thereof with abutment ends 39 on beams 31 may be effected generally conjointly with the deformation of distal free end portions 61 of tabs 41 by the operation of tools 67 in carrier 119, as discussed above, thereby to assist in the retention of the end frame and stator 33 against the radial displacement from the assembly relation with respect to each other, as previously discussed in detail. This deformation of sections 69 of end frame 37 is best seen in FIGS. 8 and 9.

Further and alternatively, instead of utilizing tools 65, 67 to effect the initial and subsequent deformations of tabs 41, as discussed above, a set of tools 75 may be arranged in carrier 119 of head 99 and predeterminately disposed to generally conjointly effect the deformations of intermediate sections 73 of the tabs into engagement with at least opposed sidewalls 55, 57 of apertures 47 within end frame 37 and, at least generally conjointly therewith, the deformations of distal free end portions 61 of the tabs into engagement with opposite face 45 of the end frame thereby to retain it against both the axial and radial displacement from the assembly relation with respect to beams 31 and stator 33, as previously discussed in detail. Of course, with tools 75 arranged in carrier 119, indexing of the carrier is not necessary since intermediate sections 73 and distal free end portions 61 of tabs 41 are conjointly deformed by the operation of tools 75. This deformation by one tool 75 is best seen in FIGS. 10-12.

Figure 20:
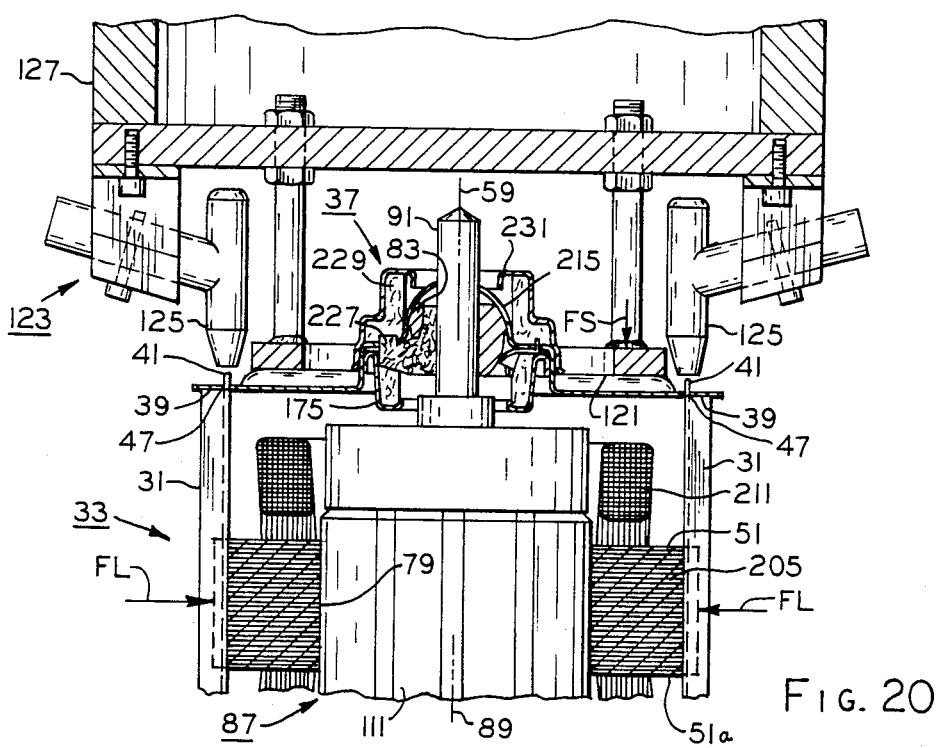
FIG. 20 is a fragmentary view illustrating an alternative apparatus in one form of the invention for assembling the stator and the end frame of the dynamoelectric machine of FIG. 1 and illustrating principles which may be practiced in an alternative method of assembling the stator and the end frame

An alternative apparatus 123 for assembling stator 33 and end frame 37 of dynamoelectric machine 35 is illustrated in one form of the invention in FIG. 20 having generally the same component parts and operating generally in the same manner as the previously discussed apparatus 77 with the exceptions noted hereinafter. While apparatus 123 is believed to meet at least some of the objects set out hereinabove, it is also believed that apparatus 123 has indigenous objects and advantageous features which will be in part apparent and in part pointed out in the following discussion.

In apparatus 123, a set of welding means, such as for instance plasma needle arc welding torches 125 or the like, are mounted by suitable means well known to the art to a stationary carrier 127 therefor mounted to head 99 of the apparatus for welding tabs 41 on beams 31 into securement with end frame 37 at least generally adjacent apertures 47 therein, respectively. For instance, when carrier 127 is lowered with press head 99 on dowel pins 97 to its preselected position and press plate 121 attached to the carrier is energized with end frame 37 to exert force FS thereon, welding torches 125 are predeterminately disposed at least generally adjacent distal free end portions 61 of tabs 41 on beams 31 extending through apertures 47 in the end frame, respectively. Torches 125 are available from the Linde Division of Union Carbide Corp., Chicago, Ill. under model number 997450. When so disposed adjacent distal free end portions 61 of tabs 41, torches 125 may be generally conjointly energized by suitable means (not shown) thereby to establish a set of welds, and for purposes of drawing clarity one of such welds is best seen at 131 in FIG. 21. Thus, welds 131 span across a part of the space predeterminately established between tabs 41 and the sidewalls of the apertures thereby to interconnect end frame 37 against both axial and radial displacement from the assembly relation thereof with respect to beams 31 and stator 33. If a more detailed discussion of aforementioned welding of beams 31 and end frame 37 is desired, reference may be had to the aforementioned Robert W. White and Frank R. Kuzan U.S. Pat. No. 4,480,378 and the aforementioned Robert W. White U.S. Pat. No. 4,473,764.

With reference again to the drawings in general and recapitulating at least in part with respect to the foregoing, there is illustrated a method of assembling stator 33 for dynamoelectric machine 35 and end frame 37 therefor with respect to predetermined reference axis 89 (FIGS. 13-21). Stator 33 includes bore 79 having a central axis 81, and beams 31 secured to the stator and having abutment ends 39 with tabs 41 extending therefrom, respectively (FIG. 1). End frame 37 includes apertures 47, and alignable bearing 83 associated with the end frame for defining central axis 59 thereof (FIGS. 1 and 2). In practicing this method, central axis 81 of stator bore 79 is located, and the stator bore axis is aligned at least generally coincidentally with reference axis 89 (FIG. 17). Central axis 59 of end frame 37 is aligned at least generally coincidentally with central axis 81 of stator bore 79 and reference axis 89 (FIG. 17). Apertures 47 in end frame 37 are passed generally about tabs 41 on beams 31, and the end frame is arranged at least adjacent abutment ends 39 of the beams, respectively (FIG. 18). Tabs 41 on beams 31 are secured with end frame 37 at least generally adjacent apertures 47 therein to retain stator 33 and the end frame against both axial and radial displacement with respect to each other and thereby maintain the at least general coincidental alignment of central axii 59, 81 of the end frame and stator bore 79, respectively (FIGS. 3-12 and 18-22).

When stator 33 and end frame 37 are interconnected or secured together in any of the constructions and by any of the methods of assembling to effect such constructions, as discussed hereinabove in detail, such secured together stator-end frame construction or combination comprises a first subassembly 141 of dynamoelectric machine 35 which is further discussed hereinafter. Further, although subassembly 141 may be assembled by the apparatus discussed hereinabove and illustrated for purposes of disclosure, it is contemplated that various other types of apparatus having various other component parts and operated in different manners to effect such assembly of subassembly 141 may be utilized within the scope of the invention so as to meet at least some of the objects thereof. Also, albeit not discussed in detail herein for convenience of disclosure, another opposite end frame 37a is shown and discussed herein with end frame 37a having generally the same component parts designated by the letter "a" as the previously discussed end frame 37.

Figure 22:
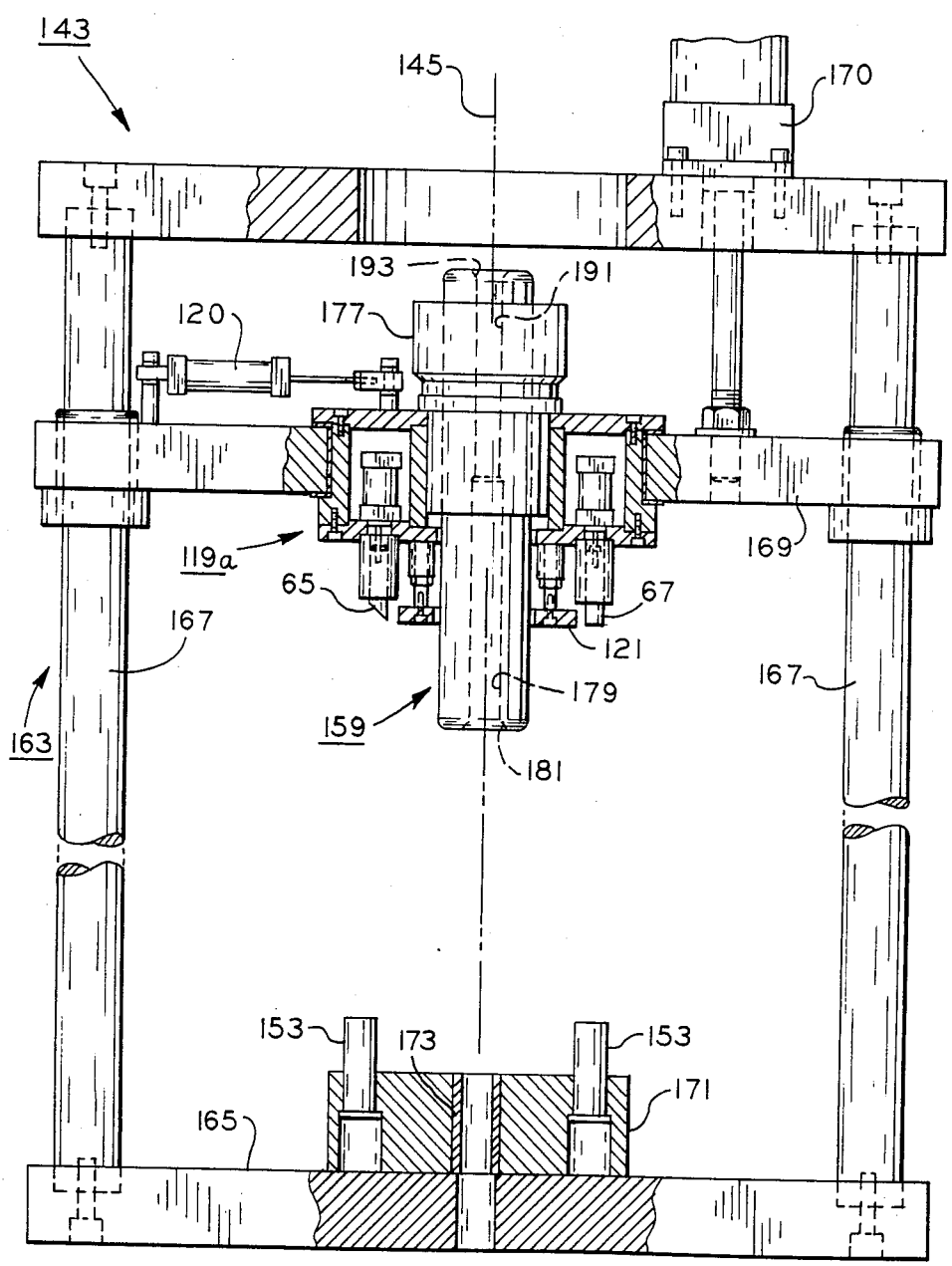
FIG. 22 is a front elevational view partially in cross section showing apparatus in one form of the invention for assembling the dynamoelectric machine of FIG. 1 and illustrating principles which may be practiced in a method of assembling the dynamoelectric machine.
Figure 23:
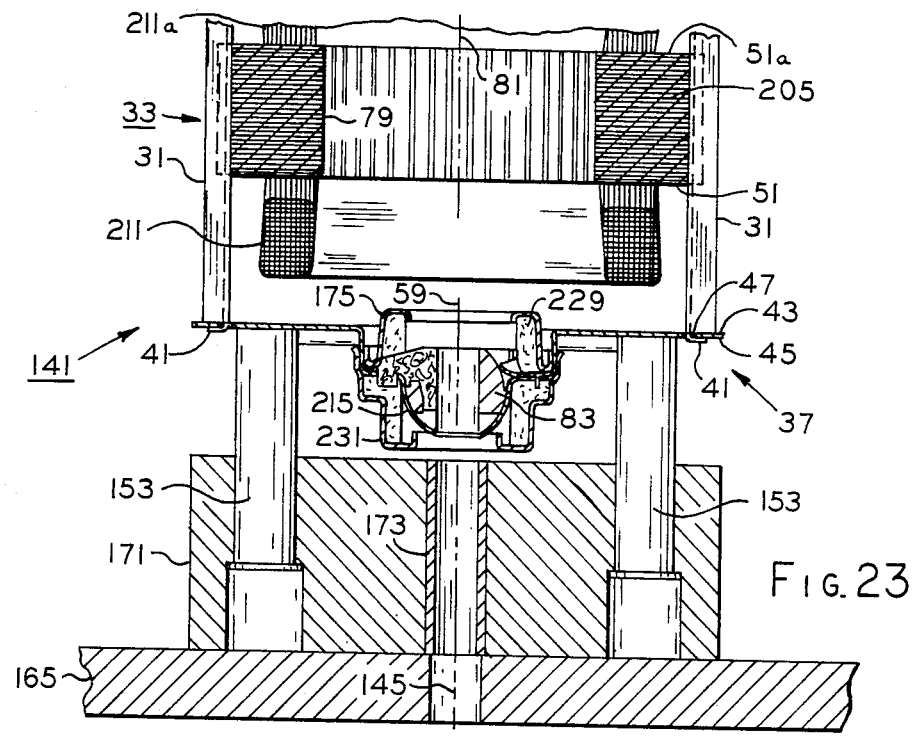
FIG. 23 is an enlarged fragmentary view partially in cross section taken from FIG. 22 and showing a stator-end frame subassembly arranged on yieldable means of the apparatus for seating the subassembly.
Figure 24:
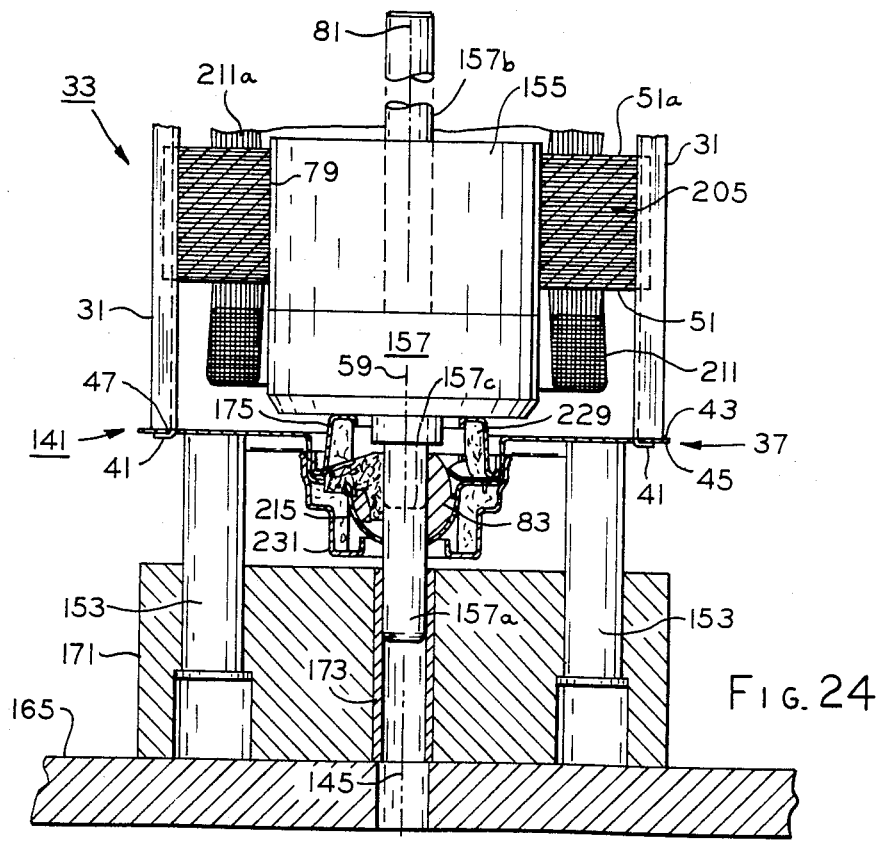
FIG. 24 is generally the same as FIG. 23 with a bore plug and draw rod associated with the stator bore of the subassembly.
Figure 25:
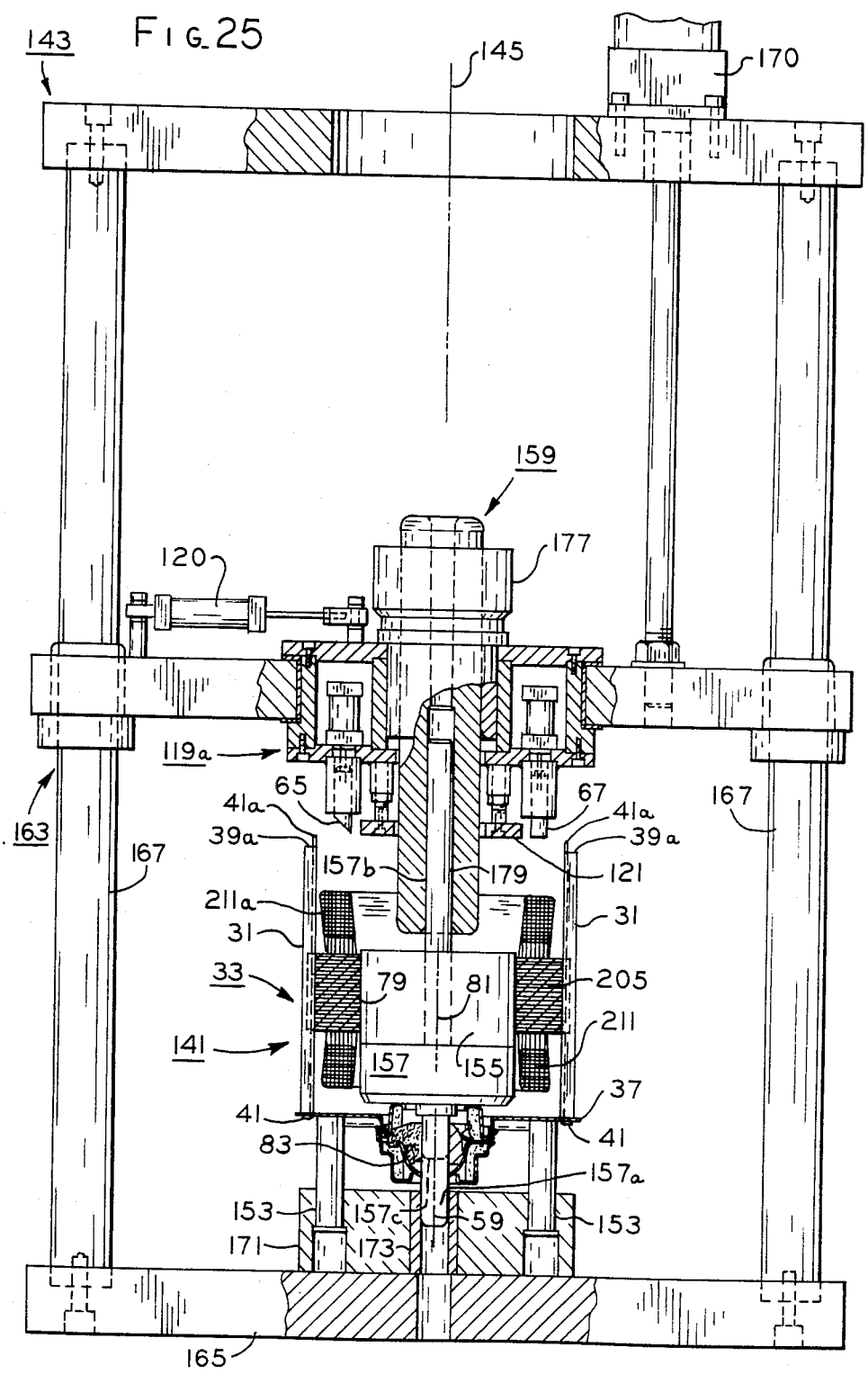
FIG. 25 is a front elevational view partially in cross section of the apparatus of FIG. 22 showing an upper platen thereof lowered with a locating pin associated with the upper plate in aligning engagement with the draw rod of FIG. 24.
Figure 28:
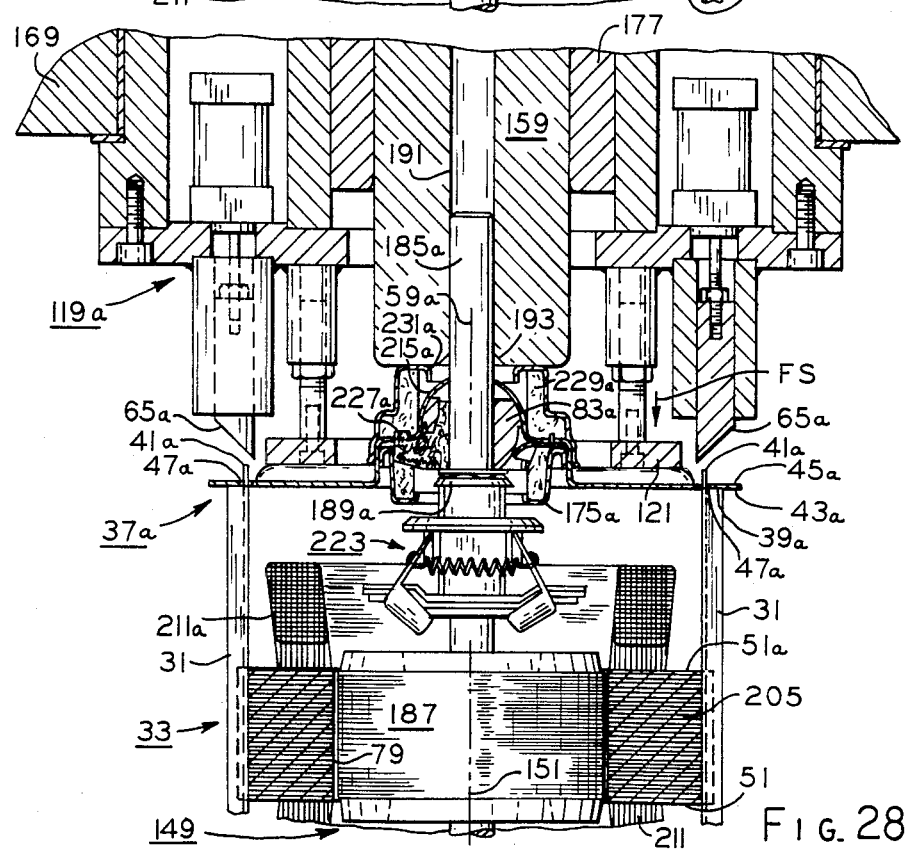
FIG. 28 is an enlarged fragmentary view partially in cross section taken from FIG. 26 showing the upper platen again lowered into a preselected position with the inverted locating pin in locating engagement with the rotatable assembly.

With reference again in general to the drawings and recapitulating at least in part with respect to the foregoing, there is shown in one form of the invention another apparatus 143 for assembling dynamoelectric machine 35 with the apparatus having a predetermined reference axis 145 (FIG. 22). The components of dynamoelectric machine 35 include first subassembly 141 (FIGS. 6, 8, 11, 23 and 19-21) and another or second subassembly 147 comprising a rotatable assembly 149 having a central axis 151 and received in another alignable bearing or bearing means 83a associated with end frame 37a so as to define a central axis 59a thereof and with the central axii of the rotatable assembly and the end frame being aligned with each other (FIG. 21). In apparatus 143, yieldable means, such as for instance a set of lockable hydraulic springs 153 or the like, for seating first subassembly 141 is yieldable or operable toward a displaced position to accommodate rocking or tilting movement of the first subassembly generally about reference axis 145 of apparatus 143 (FIGS. 23-25). Means, such as for instance a bore plug 155 associated with a generally coaxial draw rod 157 or the like, is provided for temporary engagement with stator bore 79 so as to locate it (FIG. 24). Means, such as for instance a locating pin 159 or the like, is movable into engagement with the temporary engagement means, i.e., with draw rod 157 thereof, upon the engagement of the temporary engagement means, i.e., bore plug 155 thereof, with stator bore 79 for effecting the alignment of central axis 81 of the stator bore with reference axis 145 of apparatus 143 when first subassembly 141 is seated on yieldable means or lockable hydraulic springs 153 (FIG. 25). Of course, upon the alignment of central axis 81 of stator bore 79 with reference axis 145 of apparatus 143, lockable hydraulic springs 153 are locked in the displaced position thereof thereby to retain first subassembly against further rocking movement and maintain the alignment of the stator bore and reference axii (FIG. 25). Means, such as for instance another or an inverted part 161 of locating pin 159 or the like, is movable into locating engagement with rotatable assembly 149 for aligning the aligned central axii 151, 59a of the rotatable assembly and end frame 37a of second subassembly 147 with reference axis 145 of apparatus 143 when the rotatable assembly is assembled at least in part within stator bore 29 and alignable bearing 83a of end frame 37a and upon removal of temporary engagement means 155, 157 from the stator bore (FIG. 28). Means, such as a tool carrier 119a or the like for instance, is operable generally for interconnecting stator 33 and end frame 37a against both axial and radial displacement with respect to each other thereby to retain central axii 59, 81 of end frame 37 and stator bore 79 of first subassembly 141 in the alignment thereof with central axii 59a, 151 of end frame 37a and rotatable assembly 149 of second subassembly 147, respectively (FIGS. 3-12, 21, 28 and 30).

More particularly and with specific reference to FIG. 22, apparatus 141 generally comprises a second work station for assembling together subassemblies 141, 147 of dynamoelectric machine 35, and the apparatus generally includes a press 163 or the like for instance having a stationary lower platen or base 165, a set of guide or dowel pins 167 fixedly secured to the base, and an upper platen or head 169 reciprocally movable on the dowel pins in guided relation with respect to the base by suitable means, such as for instance a double acting fluid motor 170 or the like. Thus, reference axis 145 is predeterminately provided or established in apparatus 143 by the guided relation of head 169 on dowel pins 167 with respect to base 165, and it may be noted that the other component parts utilized with the apparatus, as discussed hereinafter, are arranged so as to be generally coaxial with the reference axis of the apparatus.

In FIG. 23, a locating block 171 is secured by suitable means (not shown) to base 165 of press 163, and means, such as a locating opening 173 defined by a bushing or the like for instance, is provided in the locating block and the base for receiving in locating engagement a part of rotatable assembly 149, as discussed hereinafter, with the locating opening being arranged generally coaxially about reference axis 145 of apparatus 143. Yieldable means or hydraulic springs 153 are mounted to locating block 171 and arranged in predetermined spaced relation thereon so as to seat first subassembly 141, and such hydraulic springs are available from the A and C Engineering Co., Warren, Mich. as model Hydralock Chuck TC-200. Thus, it may be noted that upon the completion of first subassembly 141 at the first work station, as discussed hereinbefore in detail, the first subassembly may be transferred either by an operator or a transfer mechanism well known to the art (not shown) to the second work station, i.e., to apparatus 143, and during such transfer, the first subassembly is inverted so that end frame 37 thereof is seated generally in a located position on lockable hydraulic springs 153, as shown in FIGS. 23 and 24. With first subassembly 141 so seated on hydraulic springs 153, draw rod 157 is inserted through stator bore 33 to arrange a lower end portion or extension 157a of the draw rod in engagement with bearing 83 of end frame 37 and locating opening 173 in locating block 171 thereby to align central axis 59 of the bearing with predetermined reference axis 145 of apparatus 77. Bore plug 155 is then inserted by the operator into locating engagement with bore 79 of stator 33 with draw rod 157 resting against means, such as for instance a cup-shaped retainer 175 or the like, as discussed hereinafter, mounted to opposite faces 43 of end frame 37. When bore plug 155 is placed in the locating engagement thereof with stator bore 79 and draw rod 157, the stator bore becomes aligned with predetermined reference axis 145 of apparatus 77 since lower end 157a of the draw rod is in the locating engagement thereof with locating opening 173 in locating block 171, and the draw rod extends generally through the stator bore in coaxially aligned relation with central axis 81 of the stator bore, as best seen in FIG. 24.

Locating pin 159 is removably secured to head 169 of press 163 by suitable means, such as for instance a demountable bushing 177 or the like, so that the locating pin is generally coaxially arranged with reference axis 145 of apparatus 143, as best seen in FIG. 25. Means, such as for instance a locating bore 179 having a lead-in bevel 181, is coaxially provided in locating pin 159 intersecting with one of the opposite ends thereof and sized for receiving in locating engagement upper end 157b of draw rod 157 when bore plug 155 is arranged in the locating engagement thereof with stator bore 79, as discussed above in order to insure that central axii 59, 81 of end frame 37 and stator bore 79 are aligned with predetermined reference axis 145 of apparatus 77. Thus, head 169 of press 163 may be actuated by double acting fluid motor 170 and protractively moved downwardly on dowel pins 167 of the press toward a position in which upper end 157b of draw rod 157 is led into and received in locating and aligning engagement within bore 179. In response to these above discussed locating engagements of bore plug 155 with stator bore 79 and draw rod 157 with locating opening 173 and bore 179 of locating pin 159, first subassembly 141 is tiltably or rockably moved on hydraulic springs 153 generally about reference axis 145 of apparatus 143 thereby to effect the alignment of central axis 81 of the stator bore with the reference axis and, of course, opening 173 in locating block 171 of press 163. As previously mentioned, hydraulic springs 153 are yieldable toward displaced positions to accommodate the rockable movement of first subassembly 141 when central axis 81 of stator bore 79 is aligned with reference axis 145 of apparatus 143. Hydraulic springs 153 are then hydraulically locked, as well known in the art, in their respective displaced positions thereby to obviate radial displacement movement of first subassembly 141 from its position in which central axis 81 of stator bore 79 is aligned with reference axis 145 of apparatus 141. While lockable hydraulic springs 153 are illustrated herein for purposes of disclosure, it is contemplated that various other yieldable means may be employed for seating first subassembly 141 and accommodating the rockable movement thereof within the scope of the invention so as to meet at least some of the objects thereof.

Figure 26:
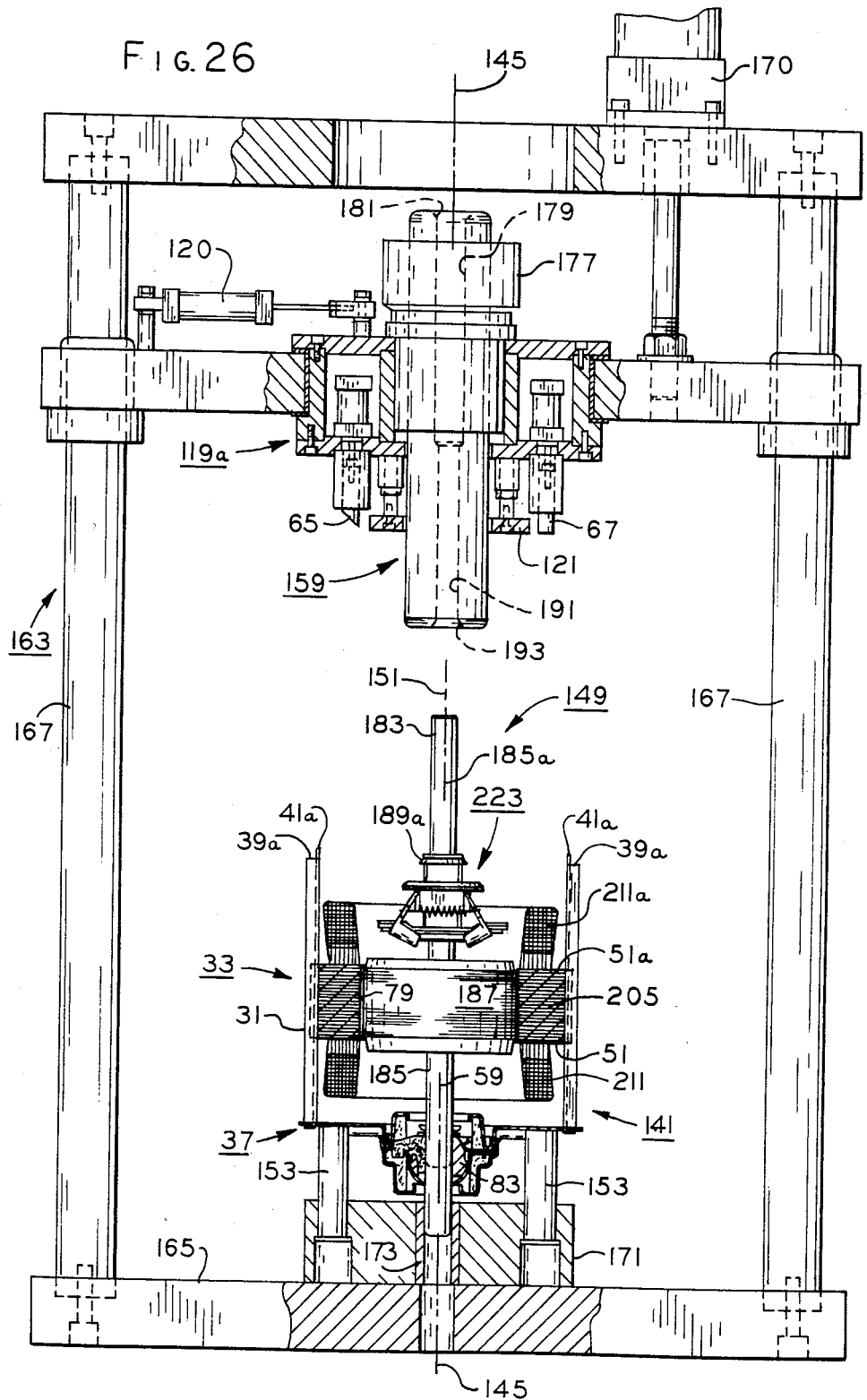
FIG. 26 is a front elevational view partially in cross section of the apparatus of FIG. 22 showing the upper platen raised and a rotatable assembly of the dynamoelectric machine associated with the subassembly in place of the bore plug and draw rod with the locating pin rearranged in an inverted position on the upper platen.
Figure 27:
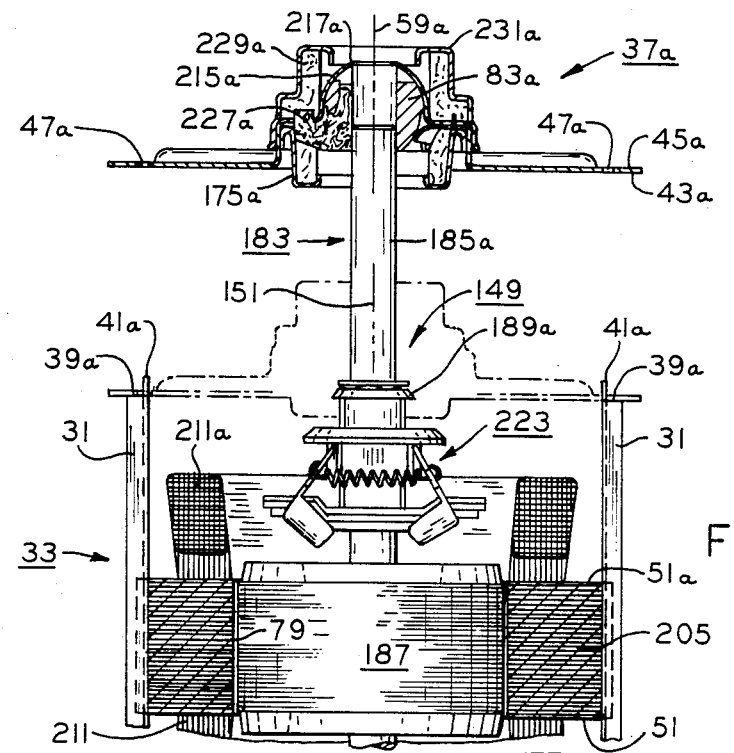
FIG. 27 is an enlarged fragmentary view partially in cross section taken from FIG. 26 showing an opposite end frame of the dynamoelectric machine arranged in locating engagement with the rotatable assembly.

Subsequent to the locking of hydraulic springs 153 to maintain the alignment of central axis 81 of stator bore 79 with reference axis 145 of apparatus 143, head 169 of press 163 may be retractively moved upwardly toward its at-rest position on dowel pins 167 thereby to release bore 179 of locating pin 159 from the locating engagement thereof with upper end 157b of draw rod 157, as best seen in FIG. 26. When so released, draw rod 157 and bore plug 155 may be manually removed by the operator from stator bore 79, and locating pin 153 and its bushing may be removed from head 169 of press 163. Removal of locating pin 153 accommodates the subsequent manual placement of rotatable assembly 149 in association with first subassembly 141 mounted in apparatus 143, as best seen in FIG. 27. Rotatable assembly 149 includes a shaft 183 having opposite shaft end portions or extensions 185, 185a with a rotor 187 mounted therebetween to the shaft, and a pair of thrust taking devices, such as for instance thrust bearings 189, 189a or the like, are secured to the opposite shaft extensions, respectively. While rotor 187 is illustrated herein as a squirrel cage induction type, it is contemplated that other types of rotors, such as those of the reluctance or permanent magnet types or the like for instance, may be utilized within the scope of the invention so as to meet at least some of the objects thereof. When rotatable assembly 149 is associated with first subassembly 141, rotor 187 is disposed at least in part within bore 79 of stator 33, and at the same time, opposite shaft extension 185 is passed through alignable bearing 83 in end frame 37 into locating opening 173 of locating block 171 and base 165 of press 163 into locating engagement with the alignable bearing and the locating opening. Of course, thrust bearing 189 on shaft extension 185 is seated against alignable bearing 83 in end frame 37 when rotatable assembly 149 is associated with first subassembly 141, as discussed above. In this manner, it may be noted that the locating engagement of opposite shaft extension 185 with locating opening 173 in locating block 171 and press base 165 effects not only the alignment of central axis 151 of rotatable assembly 149 at least generally coincidentally with reference axis 145 of apparatus 143 but also effects the alignment of central axis 59 of end frame 37 defined by alignable bearing 83 thereof with the reference axis. Furthermore, it may also be noted that the alignment of central axis 151 of rotatable assembly 149 with reference axis 145 of apparatus 143 serves to establish a more uniform air gap between rotor 187 and stator bore 79 which has its central axis 81 in alignment with the reference axis, as discussed hereinabove.

When central axis 151 of rotatable assembly 149 is located in alignment with reference axis 145 of apparatus 143, the operator may manually arrange alignable bearing 83a of end frame 37a in locating engagement about opposite shaft extension 185a of the rotatable assembly thereby to place central axis 59a of the end frame, as defined by its alignable bearing, in alignment with the coincidentally aligned central axis of the rotatable assembly and reference axis of the apparatus, as best seen in FIG. 27. With alignable bearing 83a in end frame 37a so disposed in locating engagement about opposite shaft extension 185a, the operator may manually slide the alignable bearing with the end frame downwardly on the opposite shaft extension toward the position of the end frame, as illustrated in dotted outline in FIG. 27, with respect to stator 33. During this downward movement of alignable bearing 83a with end frame 37a, the operator passes apertures 47a in the end frame over tabs 41a on beams 31 seating or engaging opposite face 43a of the end frame against at least some of abutment ends 39a of the beams, respectively. With tabs 41a on beams 31 so received within apertures 47a in end frame 37a, it may be noted that the tabs are predeterminately spaced away from the sidewalls of the apertures, i.e., generally in radially spaced relation between at least opposed sidewalls 55a, 57a of the apertures, with distal free end portions 61a of the tabs extending beyond opposite face 45a of the end frame, respectively. Of course, the association of end frame 37a with beams 31 is the same as that previously discussed for the association of end frame 37 with the beams, as illustrated in FIGS. 3-7. Although end frame 37a and rotatable assembly 149 are described herein as being separately or successively associated with each other for assembly in apparatus 143, it is contemplated that such end frame and rotatable assembly may be assembled together as a subassembly and disposed simultaneously in such subassembly in the apparatus for assembly with subassembly 141 within the scope of the invention so as to meet at least some of the objects thereof.

With tabs 41a of beams 31 so received in apertures 47a of end frame 37a, as discussed above, locating pin 159 and bushing 177 may be reassembled with head 169 of press 163 so as to resecure the locating pin in an inverted position to the press head, and in this inverted position, the locating pin is again generally coaxially arranged with reference axis 145 of apparatus 143. It is contemplated that the above discussed reassembly of locating pin 159 with press head 169 may be accomplished either before or after rotatable assembly 149 is associated with first subassembly 141 on apparatus 143. Means, such as for instance another locating bore 191 having another lead-in bevel 193 or the like, is coaxially provided in locating pin 159 intersecting with the other of the opposite ends thereof and sized for receiving in locating engagement opposite shaft extension 185a of rotatable assembly 149, as best seen in FIG. 26. With locating pin 159 so reassembled in its inverted position to head 169 of press 163, the press head may again be actuated and protractively moved downwardly on dowel pins 167 of the press toward a preselected position with respect to base 165 of the press, as best seen in FIG. 28. During this lowering of press head 169, opposite shaft extension 185a is lead into locating bore 191 of locating pin 159 in its inverted position. Therefore, with opposite shaft extensions 185, 185a of rotatable assembly 149 received in locating engagement within opening 173 in press base 165 and bore 191 of locating pin 159, the alignment of central axii 151 of the rotatable assembly with reference axii 145 of apparatus 143 and central axii 59, 81 of end frame 37 and stator bore 79 in the locked position of first subassembly 141 is assured.

With press head 169 in its preselected position, press plate 121 is, of course, engaged with end frame 37a exerting force FS against opposite face 45a of the end frame, respectively. The magnitude of forces FS applied by press plate 121 is predeterminately great enough to insure that opposite face 43a of end frame 37a is urged into seating engagement with opposite abutment ends 39a of beams 31 at least generally adjacent apertures 47a in the end frame, respectively, thereby to compensate for any warpage in the end frame in the event of the occurrence thereof. When end frame 37a is so urged into the seating engagement thereof with abutment ends 39a of beams 31, the end frame and stator 33 are arranged in an assembly relation or position, and the exertion of force FS by press plate 121 on the end frame is effective to maintain the end frame against displacement movement from such assembly relation when the stator is locked against displacement movement by hydraulic springs 153.

Figure 29:
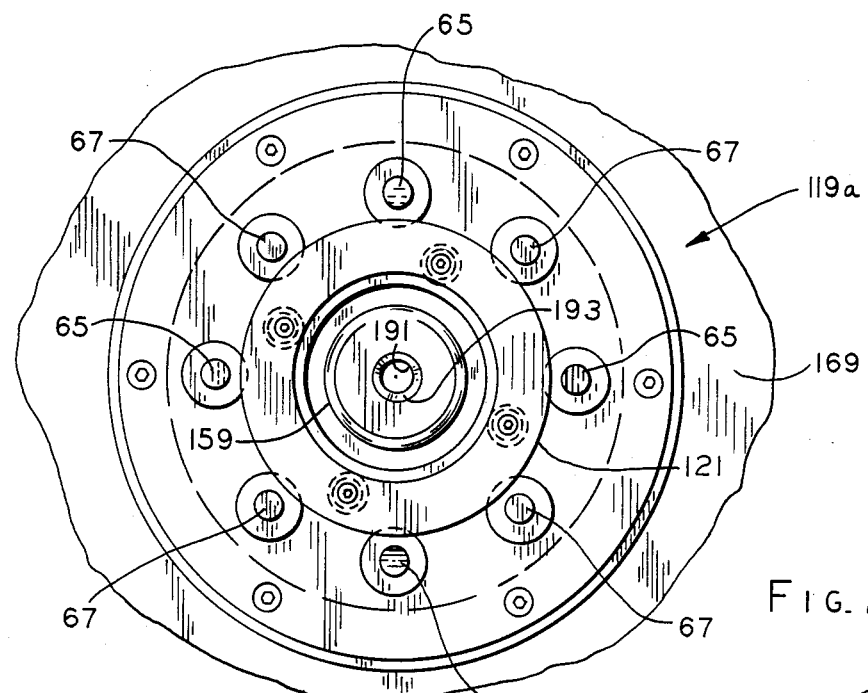
FIG. 29 is an enlarged fragmentary bottom elevational view taken from FIG. 22 of a tool carrier associated with the upper.

A tool carrier 119a, which has generally the same component parts and is operable generally in the same manner as the previously discussed tool carrier 119, is disposed in press head 169 so as to be rotatably movable or indexed about locating pin 159, as best seen in FIGS. 22, 28 and 29. Thus, with press head 169 lowered into its preselected position and press head 121 urging end frame 37a toward the assembly relation thereof with stator 33, tools 65 in carrier 119a of the press head are predeterminately disposed with respect to tabs 41a to effect the initial deformations thereof, respectively. Of course, tools 65 are also actuated generally simultaneously to effect the generally simultaneously, initial deformation of tabs 41a so as to engage intermediate sections 63a of the tabs with opposed sidewalls 57a of aperture 47a in end frame 37a thereby to retain it against radial displacement with respect to beams 31 and stator 33, respectively, as previously discussed in detail. This initial deformation of tabs 41a by one of tools 65 is best seen in FIG. 5. It may be noted that opposite pairs of apertures 47a in end frame 37a and tabs 41a on beams 31 are predeterminately arranged so as to be generally radially spaced on opposite sides of central axis 59a of the end frame when in the assembly relation thereof with stator 33. Further, it may also be noted that opposite pairs of tools 65 are generally simultaneously actuated in directions generally radially of central axis 59a of end frame 37a so that the tool forces exerted onto the end frame are generally self canceling as previously mentioned, when intermediate sections 63a of tabs 41a are deformed into engagement with aperture sidewalls 57a on the end frame, respectively. Thus, the self-canceling effect of tools 65a does not affect the aligned relation of control axis 81a, 151 of end frame 37a and rotatable assembly 149 with reference axis 145 of apparatus 143.

After the initial deformation of tabs 41a by tools 65a, carrier 119a in head 169 of press 163 may be rotated or indexed toward a preselected indexed position in which tools 67 of the carrier are predeterminately disposed to effect the subsequent deformation of tabs 41a. When carrier 119a is in the preselected indexed position, tools 67 are also actuated generally simultaneously to effect the generally simultaneous deformations of distal free end portions 61a of tabs 41a into engagement with opposite face 45a of end frame 37a thereby to retain the end frame against axial displacement from the assembly relation thereof with respect to beams 31 and stator 33, respectively. This subsequent deformation of distal free end portions 61a of tabs 41a by one of tools 67a is best seen in FIGS. 6 and 7.

Alternatively, during the subsequent deformations of tabs 41, the deformations of sections 69a of end frame 37a into the locking engagement thereof with abutment ends 39a on beams 31 may be effected thereby to assist in the retention of the end frame against the radial displacement from its assembly relation with respect to stator 33. This subsequent deformation of sections 73a in end frame 37a is best seen in FIGS. 8 and 9.

Further and alternatively, instead of utilizing tools 65, 67 to effect the initial deformations of tabs 41a, tools 75 may be arranged in carrier 119a and predeterminately disposed to generally conjointly effect the deformations of intermediate sections 73a of tabs 41a into engagement with at least opposed sidewalls 55a, 57a of apertures 47a in and from 37a and, at least generally conjointly therewith, the deformations of distal free end portions 61a of the tabs into engagement with opposite face 45a of the end frame thereby to retain it against both axial and radial displacement from the assembly relation with respect to beams 31 and stator 33. This deformation by one tool 75 is best seen in FIGS. 10-12.

Figure 30:
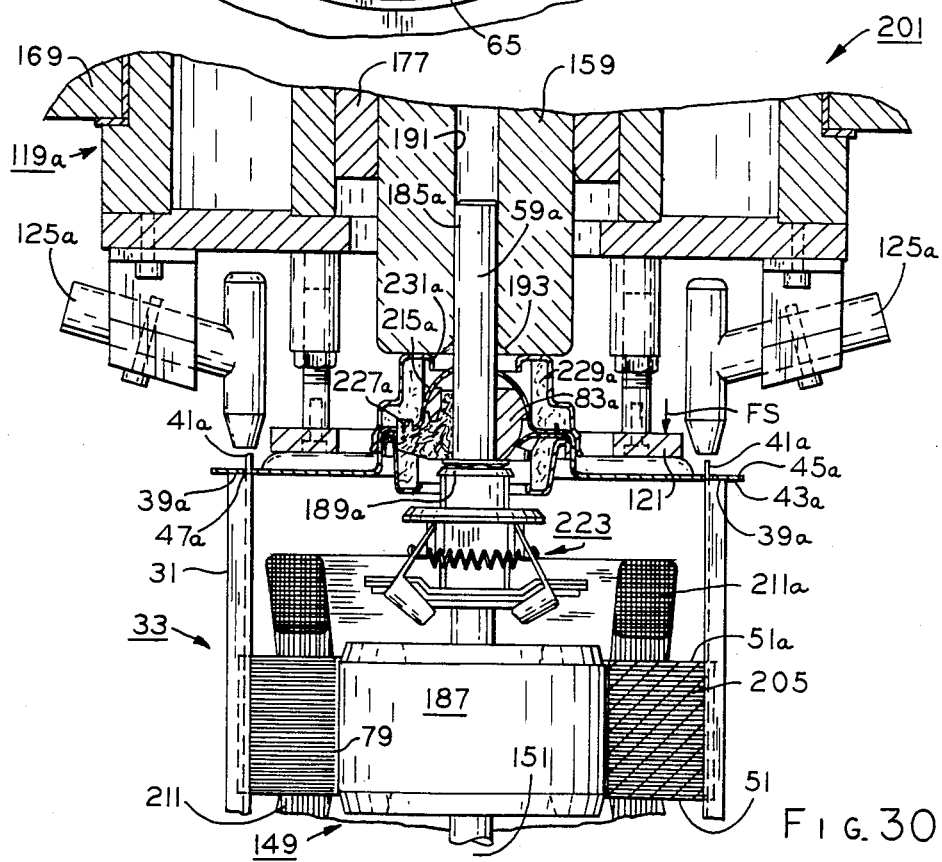
FIG. 30 is a fragmentary view showing alternative apparatus in one form of the invention for assembling the dynamoelectric machine of FIG. 1 and illustrating principles which may be practiced in an alternative method of assembling the dynamoelectric machine.

An alternative apparatus 201 in one form of the invention for assembling components of dynamoelectric machine 35 is illustrated in FIG. 30 having generally the same component parts and operating generally in the same manner as the previously described apparatus 143 with the exceptions noted hereinafter. While apparatus 201 meets at least some of the objects set out hereinabove, it is also believed that apparatus 201 has indigenous objects and advantageous features which will be in part apparent and in part pointed out in the following discussion.

In apparatus 201, carrier 119a is replaced by stationary carrier 127a having welding means, such as for instance plasma needle arc welding torches 125a, which are mounted thereto by suitable means well known to the art and carrier 127a is mounted to head 169 of press 163. Welding torches 125a and stationary carrier 127a are the same as the previously discussed welding torches 125 mounted to carrier 127 of apparatus 123. Of course, when head 169 of press 163 is lowered to its preselected position on dowel pins 167 and press plate 121 is engaged with end frame 37 to exert force FS thereon, welding torches 125a are disposed and operated in the same manner discussed hereinabove with respect to apparatus 143 to effect the welded securement of end frame 37a to beams 31, as best seen in FIG. 21. Again, if a more detailed discussion of the welding together of beams 31 and end frame 37a is desired, reference may be had to the aforementioned Robert W. White and Frank R. Kuzan U.S. Pat. No. 4,480,378 the aforementioned Robert W. Wnite U.S. Pat. No. 4,473,764.

Referring again in general to the drawings and recapitulating at least in part with respect to the foregoing, there is illustrated a method of assembling dynamoelectric machine 35 with respect to predetermined reference axis 145. Components of dynamoelectric machine 35 include stator 33 having bore 79 therethrough with central axis 81, end frames 37, 37a with central axii 59, 59a, and rotatable assembly 149 with central axis 151 and with end frame 37 being interconnected against displacement with stator 33 so that the central axii 59, 81 thereof are aligned thereby to define subassembly 141 (FIGS. 1 and 23). In practicing this method, subassembly 141 is located in a position so that the aligned central axii 59, 81 of end frame 37 and stator bore 79 are at least generally coincidental with reference axis 145 (FIGS. 23-25). Rotatable assembly 149 is placed in part within stator bore 79 and end frame 37 when the subassembly is in its located position, and locating central axis 151 of the rotatable assembly at least generally coincidentally with reference axis 145 (FIG. 26). End frame 37a is arranged on rotatable assembly 149 so that central axii 59a, 151 thereof are aligned at least generally coincidentally with each other, and thereby aligning also central axis 59a of end frame 37a with reference axis 143 and central axii 59, 81 of end frame 37 and stator bore 79 of subassembly 141 (FIGS. 27 and 28). End frame 37 and stator 33 are interconnected against displacement from the assembly relation thereof, and thereby central axii 59, 59a, 81, 151 of end frame 37a, rotatable assembly 149 and end frame 37 and stator bore 79 of subassembly 141 are maintained at least generally coincidental with each other, respectively (FIGS. 3-12, 21, 28 and 30).

Dynamoelectric machine 35 is also illustrated herein with the dynamoelectric machine having opposite end frames 37, 37a including opposite faces 43, 45 and 43a, 45a with apertures 47, 47a intersecting with the opposite faces, respectively (FIG. 1). Stator 33 is arranged generally between opposite end frames 37, 37a, and a set of means, such as beams 31 or the like for instance, is associated with the stator for supporting the end frames so as to prevent both axial and radial displacement thereof with respect to the stator, respectively (FIGS. 1-12). Supporting means or beams 31 include a pair of opposite abutment means, such as for instance abutment ends or end portions 39, 39a or the like, adapted for disposition at least adjacent opposite faces 43, 43a of end frames 37, 37a, respectively (FIGS. 1-12). A pair of opposite extension means, such as tabs 41, 41a or the like for instance, are provided on opposite abutment means or abutment ends 39, 39a of beams 31 protruding through apertures 47, 47a in end frames 37, 37a beyond opposite faces 45, 45a thereof, and the extension means or tabs are adapted for deformation into engagement with the opposite end frames within the apertures therein and also with opposite faces 45, 45a of the end frames at least generally adjacent the apertures therein so as to retain the end frames against both the axial and radial displacement with respect to stator 33, respectively (FIGS. 1-12).

More particularly and with specific reference to FIGS. 1 and 2, dynamoelectric machine 35 includes a stationary assembly, indicated generally at 203, and rotatable assembly 149. Stationary assembly 203 comprises stator 33, beams 31 secured to the stator adjacent peripheral portion 49 thereof, as previously mentioned, and opposite end frames 37, 37a secured to the beams in the manners previously discussed and as illustrated in FIGS. 3–12. Stator or core 33, as illustrated herein for purposes of disclosure, may be formed of a plurality of ferromagnetic laminations 205 arranged generally in face-to-face relation in a stack thereof and having opposite end faces 51, 51a which are respectively intersected by bore 79 extending generally axially through the stack of laminations. A plurality of generally radially disposed winding means accommodating slots 207 are also provided in stator 33 intersecting both bore 79 and opposite end faces 51, 51a thereof. Winding means 209, such as a plurality of conductor turns or coils thereof, is disposed in slots 207 with suitable insulation therebetween, and the winding means has a pair of opposite generally annular groupings of end turns 211, 211a thereof disposed generally about bore 79 of stator 33 adjacent opposite end faces 51, 51a thereof, respectively.

End frames 37, 37a are lanced or otherwise formed from a metallic sheet material, such as for instance sheet steel or the like, and it is contemplated that such forming of the end frames may be accomplished by the use of progressive dies or the like for instance (not shown). End frames 37, 37a include a generally planar portion or sections 213, 213a formed so as to extend about generally central portions of the end frames which define means, such as bearing seats or seating surfaces 215, 215a or the like, for seating or bearing engaged with bearings 83, 83a, as further discussed hereinafter, and shaft receiving openings 217, 217a extend through the bearing seats, respectively. Although end frames 37, 37a are disclosed as having generally planar portions 213, 213a the end frame may be provided with means, such as for instance a plurality of ribs 219, 219a or the like, for strengthening the generally planar portions and may have passages (not shown) for the passage of ambient air therethrough, respectively. Apertures or generally elongate slots 47, 47a are arranged in preselected locations generally radially outwardly of the central portion of end frames 37, 37a adjacent peripheral marginal or circumferential portions or edges 53, 53a thereof, and opposed sidewalls 55, 57 and 55a, 57a of the apertures are arranged so as to be generally perpendicular to radius lines (not shown) emanating from the central portion of the end frames, as previously mentioned. While the construction and configuration of end frames 37, 37a are described and illustrated herein for purposes of disclosure, it is contemplated that various other end frames having different constructions and configurations as well as being formed in different manners and of different material may be utilized within the scope of the invention so as to meet at least some of the objects thereof.

Rotatable assembly 149 includes rotor 187 mounted to shaft 183 between opposite shaft extensions 185, 185a for conjoint rotation therewith, and thrust devices 189, 189a are secured to the opposite shaft extensions for thrust taking or end play engagement with bearings 83, 83a of end frames 37, 37a, respectively, as previously mentioned. Rotor 187 is disposed at least in part within bore 79 of stator 33 with a generally uniform air gap therebetween and is arranged in selective magnetic coupling relation with winding means 209 of stator 33 upon the excitation thereof when dynamoelectric machine 35 is energized across a power source (not shown). Although not previously shown for the purpose of simplicity during the discussion hereinabove concerning the assembly of dynamoelectric machine 35, a centrifugal mechanism 223 is carried on opposite shaft extension 185a for conjoint rotation therewith, and if a more detailed discussion of the construction and operation of the centrifugal mechanism is desired, reference may be had to U.S. Pat. No. 4,208,559 issued June 17, 1980 to Steven J. Gray which is incorporated herein by reference. Of course, centrifugal mechanism 223 is arranged to operate a switch assembly 225 carried on end frame 37a for controlling the energization of winding means 209 on stator 33 during the energization of dynamoelectric machine 35, as well known in the art, and if a more detailed discussion of the construction and operation of the switch assembly and the association thereof with the winding means and the end frame, reference may be had to the aforementioned James L. King patent application Ser. No. 496,552 and the aforementioned James P. Frank and James L. King patent application Ser. No. 496,524. Opposite shaft extensions 185, 185a extend through shaft openings 217, 217a in end frames 37, 37a and are received in journaling engagement with bearings 83, 83a arranged on bearing seats 215, 215a on the end frames, respectively. If a more detailed discussion of the construction of bearings 83, 83a and seats 215, 215a is desired, reference may be had to the commonly assigned Eldon R. Cunningham patent application Ser. No. 294,748 filed Aug. 20, 1981 which is incorporated herein by reference. While bearings 83, 83a are illustrated herein for purposes of disclosure, it is contemplated that other types of bearings such as for instance sleeve bearings, ball or roller bearings or bearings integral with the end frames or the like, may be utilized within the scope of the invention so as to meet at least some of the objects thereof. As previously mentioned, thrust devices 189, 189a are carried on opposite shaft extensions 185, 185a for thrust taking or end play limiting engagement with bearings 83, 83a, respectively, in a manner well known to the art.

Lubrication systems for bearings 83, 83a comprise feeder wicks 227, 227a arranged thereon in lubricating engagement with opposite shaft extensions 185, 185a and lubricant storage wicking means 229, 229a arranged to contain and flow flow lubricant to the feeder wicks, respectively. Storage wicking means or material 229, 229a may be GELUBE available from the General Electric Company, Fort Wayne, Ind. and if a more detailed discussion of the composition and operation of the storage wicking material is desired, reference may be had to U.S. Pat. No. 3,894,956 issued July 15, 1975 to James A. Whitt which is incorporated herein by reference. While feeder wicks 227, 227a and storage wicking material 229, 229a are illustrated herein for purposes of disclosure, it is contemplated that various other feeder and storage wicks having different shapes, formed of different materials and associated in different manners with each other and with the bearings may be utilized within the scope of the invention so as to meet at least some of the claims thereof. To complete the description of dynamoelectric machine 35, retaining means or oil well covers 175, 175a are secured to opposite faces 43, 43a of end frames 37, 37a and cushion ring adaptors 231, 231a for carrying cushion rings (not shown) are secured to opposite faces 45, 45a of the end frames generally about the central portions thereof to retain storage wick 229, 229a in place with respect to feeder wicks 227, 227a and bearings 83, 83a, respectively; however, it is contemplated that other means may be employed with the end frames to effect the retention of the storage wick within the scope of the invention so as to meet at least some of the objects thereof.

Of course, in some constructions of dynamoelectric machine 35, end frame 37 thereof may not have shaft opening 217 therein, such as for instance a single shaft extension dynamoelectric machine where only shaft extension 185a extends exteriorly of the dynamoelectric machine. In this case, it is apparent that during the assembly of draw rod 157 with subassembly 141, the draw rod has a shorter lower extension or end 157c, as indicated in dotted outline in FIGS. 24 and 25. Thus, shorter lower end 157c of draw rod 157 extends only into bearing 83 of end frame 37 and not into locating opening 173 of locating block 171. As a result, the alignment of central axis 81 of stator bore 79 with predetermined central axis 145 of apparatus 77 is accomplished solely by the locating engagement of bore 179 in locating pin 159 with shaft extension 157b, as best seen in FIG. 25.

From the foregoing, it is now apparent that improved apparatus 77 and 143 have been presented meeting the objects set out hereinbefore, as well as others, and that changes as to the precise arrangements, shapes, details and connections of the components utilized in such apparatus may be made by those having ordinary skill in the art without departing from the spirit of the invention or the scope thereof as set out in the claims which follow.

What I claim as new and desire to secure by Letters Patent of the United States is:

1. Apparatus for assembling a stator for a dynamoelectric machine with an end frame therefor, the stator including a bore having a central axis, a set of beams secured to the stator and having at least one abutment portion with a tab extending therefrom, respectively, and the end frame including a pair of opposite faces with a set of apertures intersecting therebetween, respectively, and an alignable bearing means associated with one of the opposite faces of the end frame for defining a central axis thereof, the apparatus comprising:
    a base having an opening therethrough;
    a supporting member mounted to said base and including a bore, and means for seating the stator;
    an expandable arbor mounted to said base and having a predetermined reference axis, said expandable arbor extending through said supporting member bore and the stator bore when the stator is seated on said seating means of said supporting member;
    means operable generally for actuating said expandable arbor into locating engagement with the stator bore so as to align the central axis thereof with the predetermined reference axis of said expandable arbor;
    extension means mounted to said expandable arbor and arranged generally coaxially with the predetermined reference axis for receiving in locating engagement the alignable bearing means of the end frame so as to align the central axis thereof with the predetermined reference axis and stator bore axis at least when one of the opposite face thereof is seated against the at least one abutment portions of the beams with the tabs thereof extending through the apertures in the end frame beyond the other of the opposite faces thereof, respectively; and
    means for securing the tabs to the one end frame when the central axii of the stator bore and the end frame are aligned with the predetermined reference axis.

2. Apparatus for assembling a stator for a dynamoelectric machine with an end frame therefor, the stator including a bore having a central axis, a set of beams secured to the stator and having at least one abutment with a tab extending therefrom, respectively, and the end frame including a pair of opposite faces with a set of apertures intersecting therebetween, respectively, and an alignable bearing means associated with the end frame for defining a central axis thereof, the apparatus comprising;
    supporting means for seating the stator with the stator being movable thereon;
    expandable means having a predetermined reference axis and expandable generally thereabout for locating engagement with the stator bore to align the central axis thereof with the predetermined reference axis when the stator is seated on said supporting means; and
    means associated with said expandable means so as to have generally the same predetermined reference axis for receiving in locating engagement the alignable bearing means of the end frame to align its central axis with the predetermined reference axis and the stator bore axis at least when one of the opposite faces of the end frame is seated against the at least one abutments of the beams with the tabs thereof extending through the apertures of the end frame beyond the other of the opposite faces thereof, respectively.

3. The apparatus as set forth in claim 2 further comprising a set of means operable generally conjointly for welding the tabs and the one end frame together at least generally adjacent the apertures therein, respectively.

4. The apparatus as set forth in claim 2 further comprising a pair of sets of means successively operable for conjointly deforming an intermediate section of the tabs into engagement with the end frame within the apertures therein and for conjointly deforming a distal section of the tabs extending beyond the other opposite face of the end frame into engagement therewith thereby to retain the one end frame against radial and axial displacement with respect to the stator, respectively.

5. The apparatus as set forth in claim 4 wherein one of said sets of said conjointly deforming means is also operable to effect the deformation of a set of sections in the end frame into locking relation with the at least one abutments of the beams thereby to assist in the retention of the one end frame against the radial displacement with respect to the beams, respectively, at least generally conjointly with the deformation of the distal section of the tabs into the engagements thereof with the other opposite face of the end frame.

6. Apparatus for assembling a stator for a dynamoelectric machine with an end frame therefor, the stator including a bore having a central axis, and a set of beams secured to the stator and having at least one abutment end portion, respectively, and the end frame including alignable bearing means associated therewith for defining a generally central axis of the end frame, the apparatus comprising:
    means for supporting the stator with the stator being movable thereon;

locating means having a predetermined reference axis and operable generally for locating engagement with the stator bore to align the central axis thereof with the predetermined reference axis; and means associated with said locating means so as to extend generally along the same predetermined reference axis thereof for receiving in locating engagement the alignable bearing means of the end frame thereby to align the central axis thereof with the aligned predetermined reference axis and the central axis of the stator bore at least when the end frame is engaged against the at least one end portions of the beams, respectively.

7. The apparatus as set forth in claim 6 further comprising means operable generally for effecting the securement of the end frame to the at least one end portion of the beams, respectively.

8. The apparatus as set forth in claim 6 further comprising means for biasing the end frame into the engagement thereof with the at least one end portions of the beams, respectively.

9. Apparatus for assembling a dynamoelectric machine with respect to a predetermined reference axis, the dynamoelectric machine including a first subassembly of an interconnected stator and first end frame with the stator having a central axis and with first alignable bearing means associated with the first end frame for defining a central axis thereof arranged in prealigned relation with the central axis of the stator bore, and another subassembly of a rotatable assembly having a central axis and another alignable bearing means associated with another end frame for defining a central axis thereof aligned with the central axis of the rotatable assembly, the apparatus comprising:

yieldable means for seating the first subassembly and yieldable toward a displaced position to accommodate rocking movement of the first subassembly with respect to the predetermined reference axis;

means for temporary engagement with the stator bore to locate it;

means movable into engagement with said temporary engagement means upon the location thereby of the stator bore and operable generally for effecting the alignment of the central axis of the stator bore with the predetermined reference axis, said yieldable means being yieldable to the displaced position thereof to accommodate the rocking movement of the first subassembly in response to the operation of said alignment effecting means when the central axis of the stator bore is aligned with the predetermined reference axis;

means movable into locating engagement with the rotatable assembly of the another subassembly for aligning the central axii of the rotatable assembly and the another end frame with the predetermined reference axis when the rotatable assembly is assembled in part within the stator bore and the first alignable bearing means thereby to also align the central axis of the first end frame with the predetermined reference axis upon the removal from the stator bore of said temporary engagement means; and means operable generally for interconnecting the another end frame and the stator against both axial and displacement movement with respect to each other thereby to retain the central axii of the stator bore and the first end frame and the central axii of the rotatable assemby and the another end frame in alignment with each other, respectively.

10. Apparatus for assembling a dynamoelectric machine with respect to a predetermined reference axis, the dynamoelectric machine having a rotatable assembly with a central axis, a first end frame with a central axis, and a subassembly including a stator having a bore with a central axis, and another end frame interconnected with the stator and having a central axis prealigned with the central axis of the stator bore, the apparatus comprising:

yieldable means for seating the another end frame of the subassembly and yieldable to accommodate rocking movement of the subassembly into an assembly position aligning the central axii of the stator bore and the another end frame with the predetermined reference axis;

means for association with the rotatable assembly to align its central axis with the predetermined reference axis when the rotatable assembly is assembled in part within the stator bore and the first end frame of the subassembly in the assembly position thereof on said yieldable means, said first end frame being arranged on said rotatable assembly with the central axii thereof in alignment; and means operable generally for interconnecting the first end frame with the subassembly against radial and axial displacement with respect thereto so as to retain the central axii of the rotatable assembly and the first end frame and the central axii of the stator bore and another end frame in alignment with each other, respectively.

11. Apparatus for assembling a dynamoelectric machine with respect to a predetermined reference axis, the dynamoelectric machine having a rotatable assembly with a central axis, a first end frame having a pair of opposite faces with a set of apertures intersecting therebetween, a first alignable bearing means associated with the first end frame for defining a central axis thereof, and a subassembly comprising a stator and another end frame having another alignable bearing means associated therewith for defining a central axis of the another end frame, the stator including a bore having a central axis, a set of beams secured to the stator and having a pair of opposite end portions with a tab extending from at least one of the opposite end portions, respectively, and the other of the opposite end portions being interconnected with the another end frame so that the central axii of the stator bore and the another end frame are arranged in aligned relation, the apparatus comprises:

yieldable means for seating the subassembly and yieldable toward a displaced position to accommodate rocking movement of the subassembly with respect to the predetermined reference axis;

means removably engaged with the stator bore for locating it when the subassembly is seated on said yieldable means and including a draw rod coaxially arranged with said locating means;

means movable into engagement with said draw rod of said locating means for effecting alignment of the central axis of the stator bore with the predetermined reference axis, said yieldable means being yieldable to the displaced position thereof to accommodate the rocking movement of the subassembly in response to the operation of said alignment effecting means when the central axis of the stator bore is aligned with the predetermined reference axis;

means for locking said yieldable means in the displaced position therof to maintain the alignment of the central axis of the stator bore with the predetermined reference axis, said alignment effecting means being disengaged from said draw rod of said locating means when said yieldable means is locked in its displaced position;

means for receiving a part of the rotatable assembly to align the central axis thereof with the predetermined reference axis when the rotatable assembly is assembled in part within the stator bore and the another alignable bearing means of the another end frame to align the central axis thereof with the predetermined reference axis upon the removal of said locating means from the stator bore, and the first alignable bearing means of said first end frame being located about another part of the rotatable assembly to align the central axis of the first end frame with the central axis of the rotatable assembly and the predetermined reference axis;

means for releasable engagement with the another part of the rotatable assembly to assure the alignment of its central axis with the reference axis with the first named part of the rotatable assembly received in said receiving means, and said first named end frame being movable on the another part of the rotatable assembly to place the aperture in the first end frame in spaced relation about the tabs on the at least one opposite end portions of the beams, respectively;

means for exerting a force on one of the opposite faces of the first end frame to urge the other of the opposite faces thereof into seating engagement with the at least one opposite end portions of the beams, respectively; and means for securing the tabs with the first end frame at least adjacent the apertures therein when the opposite face of the first end frame is seated against the at least one opposite end portions of the beams, respectively.

12. The apparatus as set forth in claim 11 wherein said securing means comprises means for welding together the tabs and the first end frame, respectively.

13. The apparatus as set forth in claim 11 wherein the securing means comprises means for deforming the tabs both into engagement with the first end frame within the apertures therein and into engagement with the one opposite face of the first end frame generally adjacent the apertures therein, respectively.

* * * * *